United States Patent
Nakamura et al.

(10) Patent No.: US 8,390,158 B2
(45) Date of Patent: Mar. 5, 2013

(54) STRUCTURE OF ROTATION DETECTOR-EQUIPPED MOTOR AND A MANUFACTURING METHOD THEREOF

(75) Inventors: Takahiro Nakamura, Anjo (JP);
Kazuhiro Nakamura, Ichinomiya (JP);
Takehide Nakamura, Handa (JP);
Shinya Suzuki, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 275 days.

(21) Appl. No.: 12/819,569

(22) Filed: Jun. 21, 2010

(65) Prior Publication Data
US 2011/0031850 A1    Feb. 10, 2011

(30) Foreign Application Priority Data
Aug. 7, 2009  (JP) ................................. 2009-185153

(51) Int. Cl.
*H02K 11/00*  (2006.01)
(52) U.S. Cl. ..................................... 310/68 B
(58) Field of Classification Search ............. 310/68 B, 310/261.1
See application file for complete search history.

(56) References Cited

U.S. PATENT DOCUMENTS

| | | | | |
|---|---|---|---|---|
| 4,868,468 A | * | 9/1989 | McMullin | 318/400.37 |
| 6,239,571 B1 | * | 5/2001 | Shimahara | 318/605 |
| 2002/0105243 A1 | * | 8/2002 | Pfetzer | 310/156.08 |
| 2007/0216240 A1 | * | 9/2007 | Kikuchi et al. | 310/68 B |

FOREIGN PATENT DOCUMENTS

| | | |
|---|---|---|
| DE | 42 03 433 A1 | 8/1993 |
| DE | 203 13 045 U1 | 10/2003 |
| JP | A-2001-078393 | 3/2001 |
| JP | A-2002-233109 | 8/2002 |
| JP | A-2008-267824 | 11/2008 |

OTHER PUBLICATIONS

May 31, 2012 Office Action issued in German Patent Application No. 10 2010 038 647.2 (with translation).
Jun. 18, 2012 Office Action issued in Chinese Patent Application No. 201010249229.0 (with translation).

* cited by examiner

*Primary Examiner* — Tran Nguyen
(74) *Attorney, Agent, or Firm* — Oliff & Berridge, PLC

(57) ABSTRACT

A motor is provided with a rotation detector including a detection rotor and a detection stator placed to face the detection rotor. The motor further includes a motor case and a motor shaft protruding out of the motor case. The detection rotor is fixed to an end of the motor shaft. The detection rotor includes a plate and a coil provided on the plate. The plate is fixed to the end of the motor shaft. Specifically, the motor shaft includes an opening in the end. The plate has a circular disc shape and a cylindrical portion protruding in the center from the back side. The cylindrical portion is press-fitted in the opening of the motor shaft to fix the plate to the end of the motor shaft.

20 Claims, 24 Drawing Sheets

STRUCTURE OF ROTATION DETECTOR-EQUIPPED MOTOR AND A MANUFACTURING METHOD THEREOF

CROSS-REFERENCE TO RELATED APPLICATIONS

This application is based upon and claims the benefit of priority from the prior Japanese Patent Application No. 2009-185153 filed on Aug. 7, 2009, the entire contents of which are incorporated herein by reference.

TECHNICAL FIELD

The present invention relates to a structure of a rotation detector-equipped motor including a rotation detector for detecting a rotation angle of a motor shaft.

BACKGROUND ART

Heretofore, a hybrid electric vehicle and an electric vehicle use a high-power brushless motor. To control the brushless motor of the hybrid electric vehicle, for instance, it is necessary to accurately detect a rotation angle of a motor shaft. This is because, for switching control of energization to each coil of a motor stator, the rotation position of a motor rotor has to be accurately ascertained. In hybrid electric vehicles, specifically, drivability is apt to deteriorate due to motor cogging. Reducing the cogging is thus desired. It is therefore necessary to accurately switch the energization to each coil.

Herein, for detection of the rotation angle of the motor shaft in a hybrid electric vehicle, a rotation detector can be used to satisfy such functions as high-temperature resistance, noise resistance, vibration resistance, and high-humid resistance. The rotation detector is directly attached to the motor shaft in the brushless motor. As this type of rotation detector, for example, a variable reactance type rotation detector is used. This rotation detector includes a detection stator including an excitation coil and a detection coil, and a detection rotor placed near the detection stator and fixed to the motor shaft. The detection coil includes two coils arranged with a phase shift of 90° from each other. When an alternating voltage having a sine wave form is applied to the excitation coil, an induced voltage is output from the two coils of the detection coil through the detection rotor. Based on the output amplitude of this induced voltage, the rotation angle of the motor shaft (the motor rotor) can be detected.

As this type of technique, there is for example a rotary machine provided with a rotation detector disclosed in Patent Literature 1 listed below. In this rotary machine, the rotation detector is placed on the outside of a motor case and thus a zero point adjustment is easily performed, so that the rotation detector is less affected by magnetic noise of the motor. In this rotary machine, the detection rotor constituting the rotation detector is fixed on a motor shaft with a retainer such as a spacer and a nut. Furthermore, the detection stator constituting the rotation detector is arranged by winding a coil on a core.

CITATION LIST

Patent Literature

Patent Literature 1: JP2001-78393 A
Patent Literature 2: JP2002-233109 A
Patent Literature 3: JP 2008-267824 A

SUMMARY OF INVENTION

Technical Problem

In the rotary machine disclosed in Patent Literature 1, the retainer is used to fix the detection rotor onto the motor shaft. Accordingly, the size of the entire rotation detector is increased, and the number of components of the rotation detector is also increased due to the addition of the retainer. It therefore takes long to assembly those components. The detection stator is arranged by winding the coil on the core and hence a cover is required to protect the rotation detector. The size of the entire rotation detector is increased by just that cover.

The present invention has been made under the above circumstances and has a purpose to provide a structure of a rotation-equipped motor capable of reducing the number of components of the rotation detector provided in the motor to restrain the size increase of the entire rotation detector.

Solution to Problem

To achieve the above purpose, one aspect of the invention provides a structure of a rotation detector-equipped motor comprising a rotation detector including a detection rotor and a detection stator placed to face the detection rotor, wherein the motor includes a motor case and a motor shaft, the detection rotor includes a plate and a coil provided on the plate, and the plate is fixed to an end of the motor shaft.

According to another aspect, the invention provides a structure of a rotation detector-equipped motor comprising a rotation detector including a detection rotor and a detection stator placed to face the detection rotor, wherein the motor includes a motor case and a motor shaft, the detection rotor includes a plate and a coil provided on the plate, the plate is fixed to an end of the motor shaft, the motor shaft includes a recess in the end, the plate has a circular disc shape and includes a cylindrical portion located in the center and protruding on a back side, the cylindrical portion is press-fitted in the recess of the motor shaft and the plate is fixed to the end of the motor shaft, the cylindrical portion is formed, on an outer periphery thereof, with a key extending in an axial direction, the recess of the motor shaft is formed with a key groove conforming to the key, the cylindrical portion is formed, on an outer periphery thereof, with a plurality of engagement lugs turned outward, the cylindrical portion is formed, at an end thereof, with an inward flange, and the plate is made of a non-magnetic material.

DESCRIPTION OF EMBODIMENTS

A detailed description of a preferred embodiment of a structure of a rotation detector-equipped motor and a manufacturing method thereof according to the present invention will now be given referring to the accompanying drawings.

Figure 1:
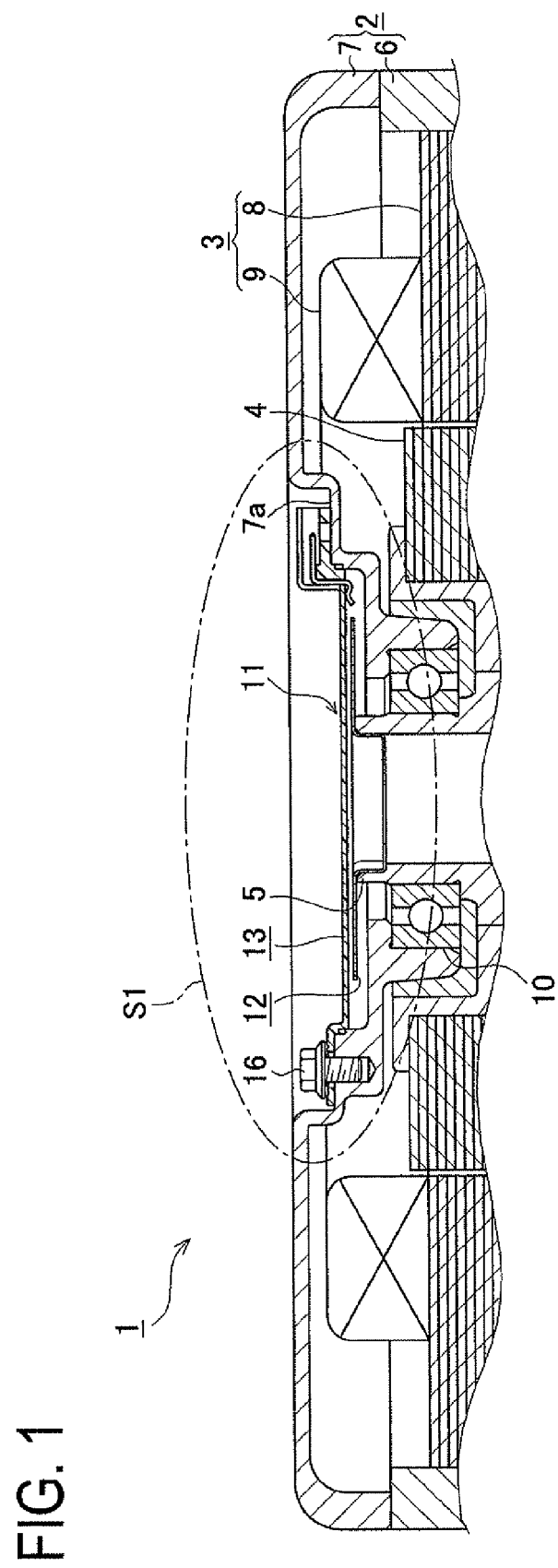
FIG. 1 is a cross sectional view showing one end part of a rotation detector-equipped motor in an embodiment.
Figure 2:
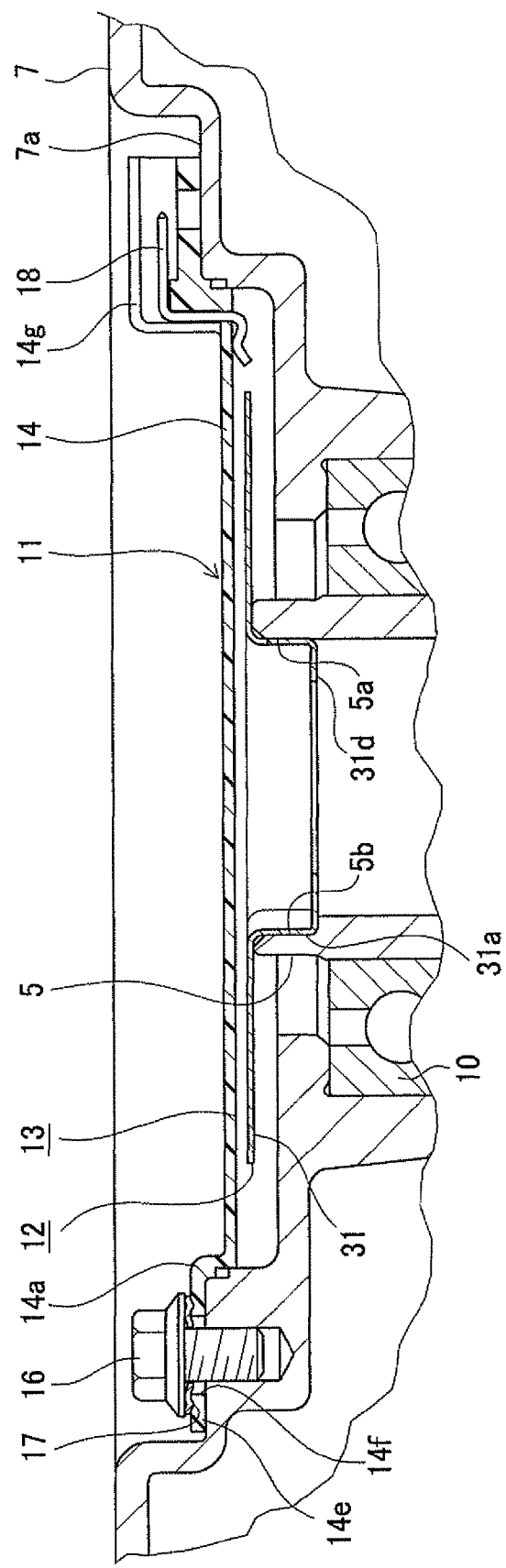
FIG. 2 is an enlarged cross sectional view showing a part surrounded by a dot-dashed ellipse in FIG. 1 in the embodiment.
Figure 3:
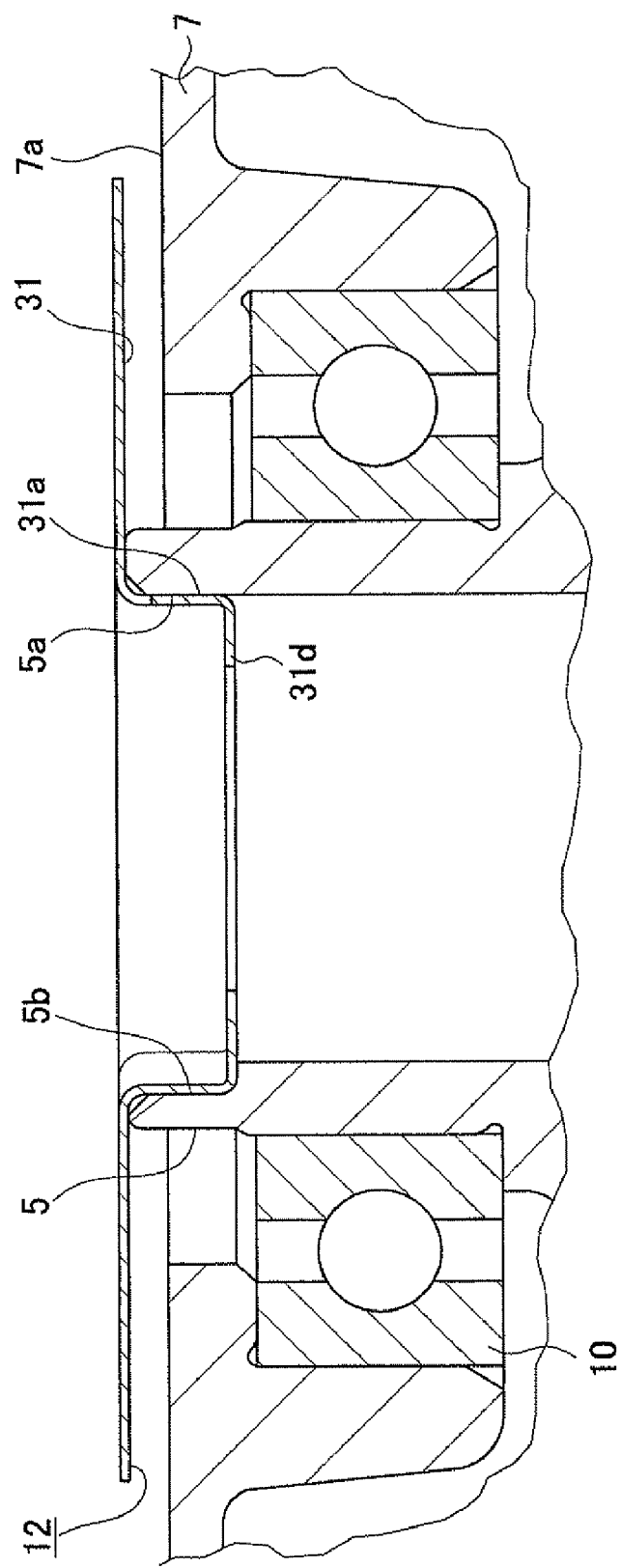
FIG. 3 is an enlarged cross sectional view showing a part of FIG. 2 in the embodiment.

FIG. 1 is a cross sectional view showing an end part of a rotation detector-equipped motor (hereinafter, simply referred to as a "motor") 1 in this embodiment. FIG. 2 is an enlarged cross sectional view showing a part surrounded by a dot-dashed ellipse in FIG. 1. FIG. 3 is an enlarged cross sectional view showing a part of FIG. 2. As shown in FIG. 1, a motor 1 includes a motor case 2, a motor stator 3 and a motor rotor 4 each provided in the motor case 2, and a motor shaft 5 integrally provided in the center of the motor rotor 4. One end of the motor shaft 5 slightly protrudes outside of the motor case 2. The motor case 2 includes a case body 6 and an end plate 7 fixed to close an open end of the case body 6.

As shown in FIG. 1, the motor stator 3 is fixed to the case body 6. The motor stator 3 includes a stator core 8 and a coil 9. The motor rotor 4 is placed on the inner side of the motor stator 3. The motor shaft 5 is rotatably supported by a bearing 10 placed in the end plate 7 and another bearing (not shown) placed in an opposite end of the motor case 2. In this embodiment, the motor shaft 5 has a hollow shape with an opening 5a at one end serving as a recess. This motor 1 is configured such that when the coil 9 of the motor stator 3 is excited, the motor rotor 4 is rotated integrally with the motor shaft 5.

As shown in FIGS. 1 and 2, the end plate 7 includes a recessed portion 7a formed outside and around the motor shaft 5. In this embodiment, as shown in FIGS. 1 to 3, a rotation detector 11 is placed in this recessed portion 7a on the outer side of the motor case 2. The rotation detector 11 includes a detection rotor 12 and a detection stator 13 placed to face the detection rotor 12 with a predetermined clearance therefrom. The detection rotor 12 is fixed to the end of the motor shaft 5 in the recessed portion 7a of the end plate 7. The detection stator 13 is fixed to the end plate 7 in the recessed portion 7a to cover the detection rotor 12.

Figure 4:
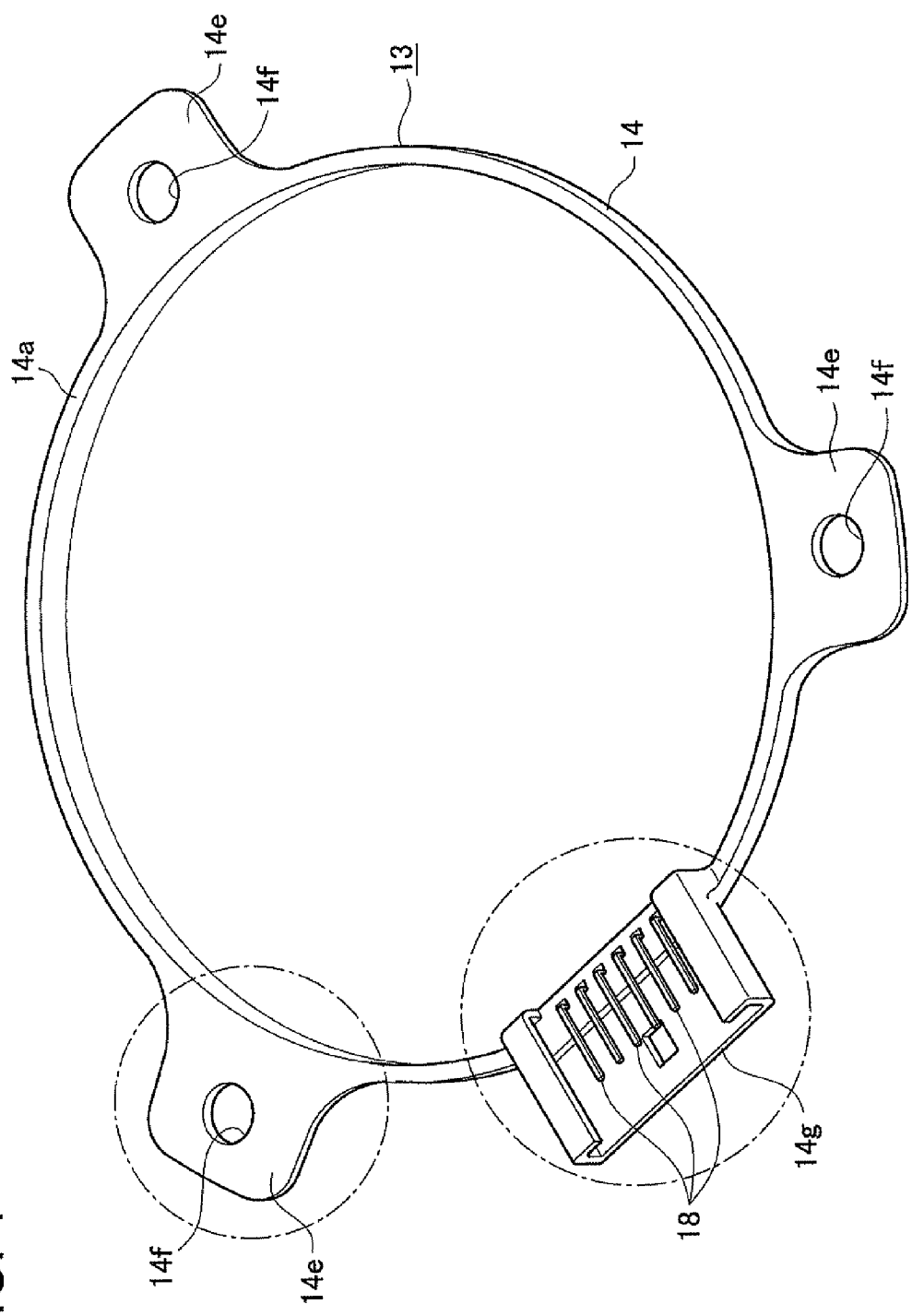
FIG. 4 is a perspective view showing a front side of a detection stator in the embodiment.
Figure 5:
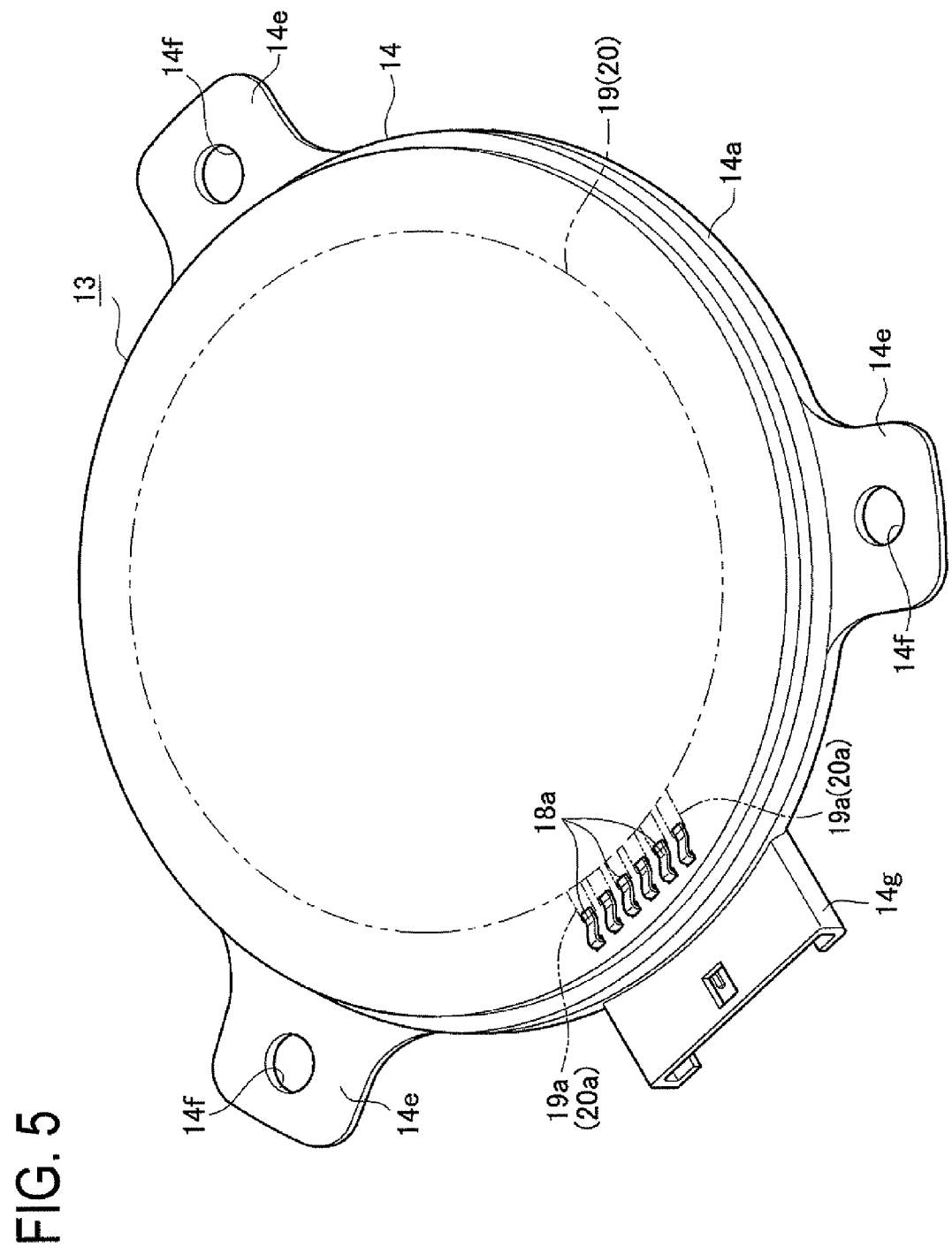
FIG. 5 is a perspective view showing a back side of the detection stator in the embodiment.

Herein, the structure of the detection stator 13 is explained below. FIG. 4 is a perspective view showing a front side of the detection stator 13. FIG. 5 is a perspective view showing a back side of the detection stator 13. The detection stator 13 includes a stator body 14 molded of resin. As a material for the stator body 14, for example, PPS resin or LCP liquid crystal polymer can be used. The stator body 14 has an almost circular disc shape and includes a circumferential wall 14a formed on the outer circumference of the front side as shown in FIGS. 4 and 5.

Figure 6:
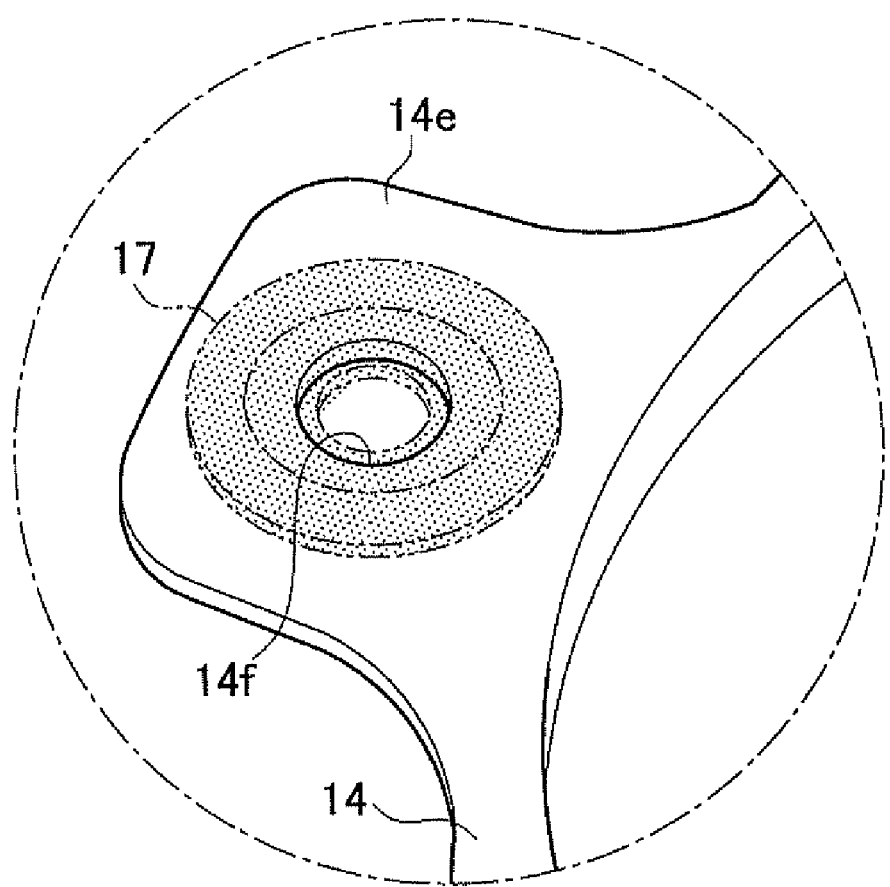
FIG. 6 is an enlarged perspective view of a bracket of a stator body in the embodiment.
Figure 7:
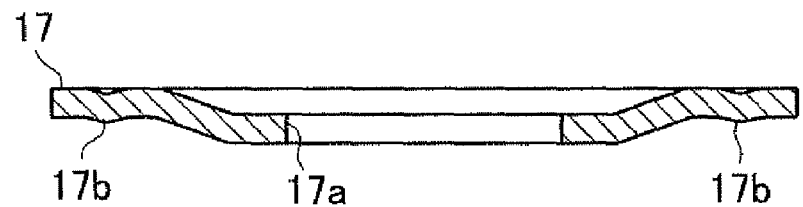
FIG. 7 is a cross sectional view of a plate spring washer in the embodiment.
Figure 8:
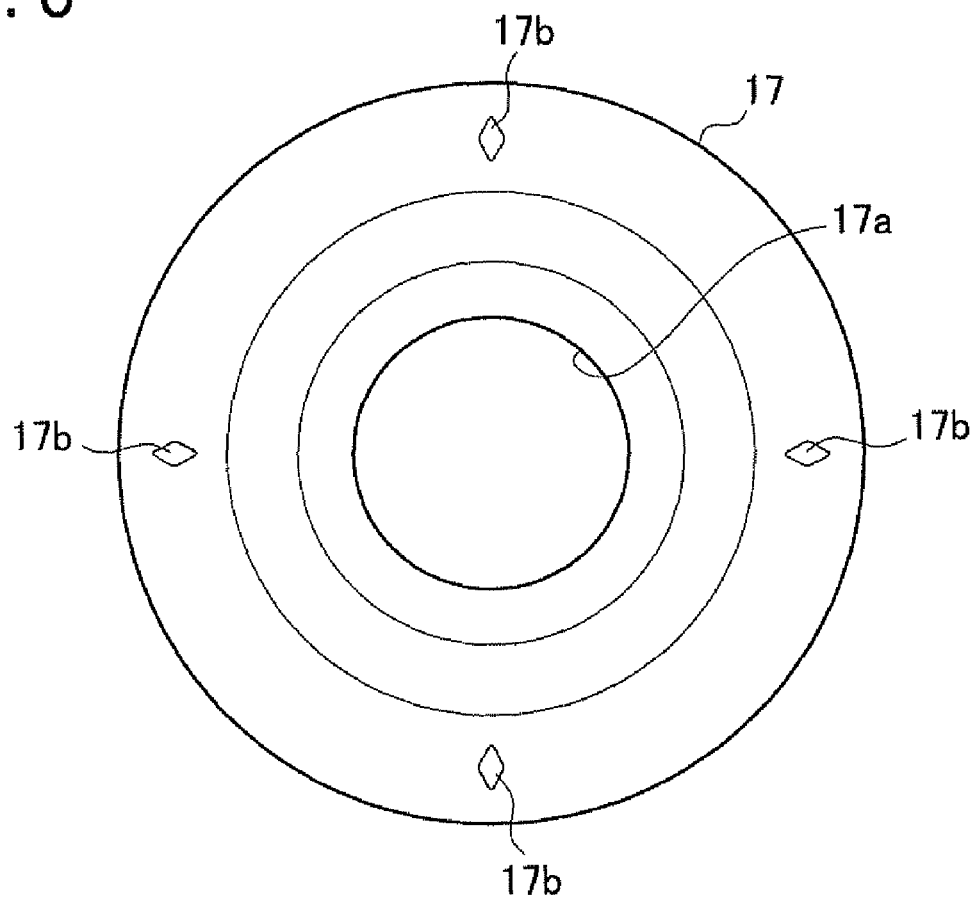
FIG. 8 is a plan view showing a lower surface of the plate spring washer of FIG. 7 in the embodiment.

The circumferential wall 14a is integrally formed with three brackets 14e each radially outwardly protruding. The brackets 14e are circumferentially spaced at equal angular intervals as shown in FIG. 4. Each bracket 14e serves as a fastening part to fix the detection stator 13 to the end plate 7 with a bolt 16 which is a fastening member. Each bracket 14e has a bolt hole 14f. FIG. 6 is an enlarged perspective view of one of the brackets 14e. As shown in FIG. 6, in the front side of the bracket 14e, a plate spring washer 17 which is an elastic element is set in correspondence with a bolt hole 14f. FIG. 7 is a cross sectional view of the washer 17. FIG. 8 is a plan view of a lower surface of the washer 17 of FIG. 7. As shown in FIGS. 7 and 8, the plate spring washer 17 has an annular shape centrally formed with a bolt hole 17a in which the bolt 16 is to be inserted and the washer 17 also has a bent form in a multi-stage manner in an outward direction from the bolt hole 17a. The lower surface of the washer 17 is formed with four rhombic or diamond-shaped protrusions 17b arranged at equal angular intervals. These protrusions 17b are engaged in the surface of the bracket 14e.

Figure 9:
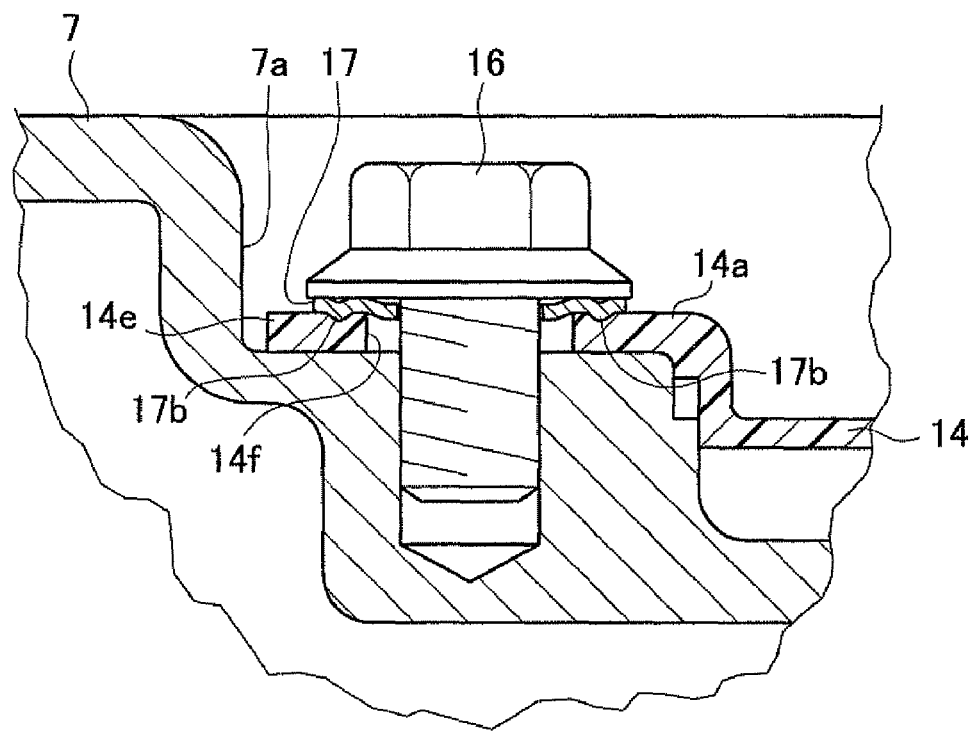
FIG. 9 is an enlarged cross sectional view showing a fastening state with a bolt shown in FIG. 2 in the embodiment.

The stator body 14 is fixed to the end plate 7 with the bolts 16 as shown in FIGS. 1 and 2. At the time of fixing, the plate spring washers 17 are individually interposed between the bolts 16 and the brackets 14e of the stator body 14. FIG. 9 is an enlarged cross sectional view showing a fastening state with the bolt 16 of FIG. 2. In this fixed state, as shown in FIG. 9, the washer 17 is allowed to be elastically deformed to a certain degree. The protrusions 17b of the washer 17 bite into and engage with the surface of the bracket 14e.

Figure 10:
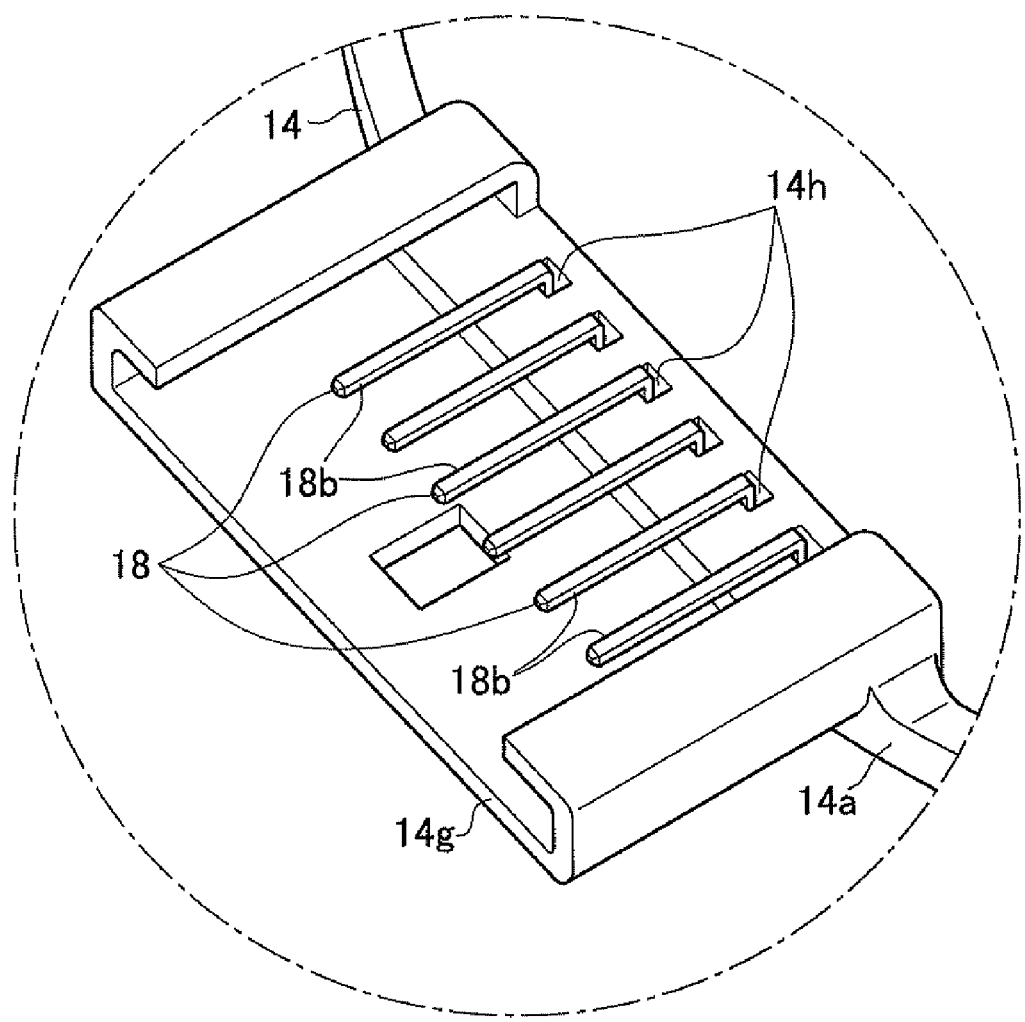
FIG. 10 is an enlarged perspective view showing a front side of a connector of the stator body in the embodiment.
Figure 11:
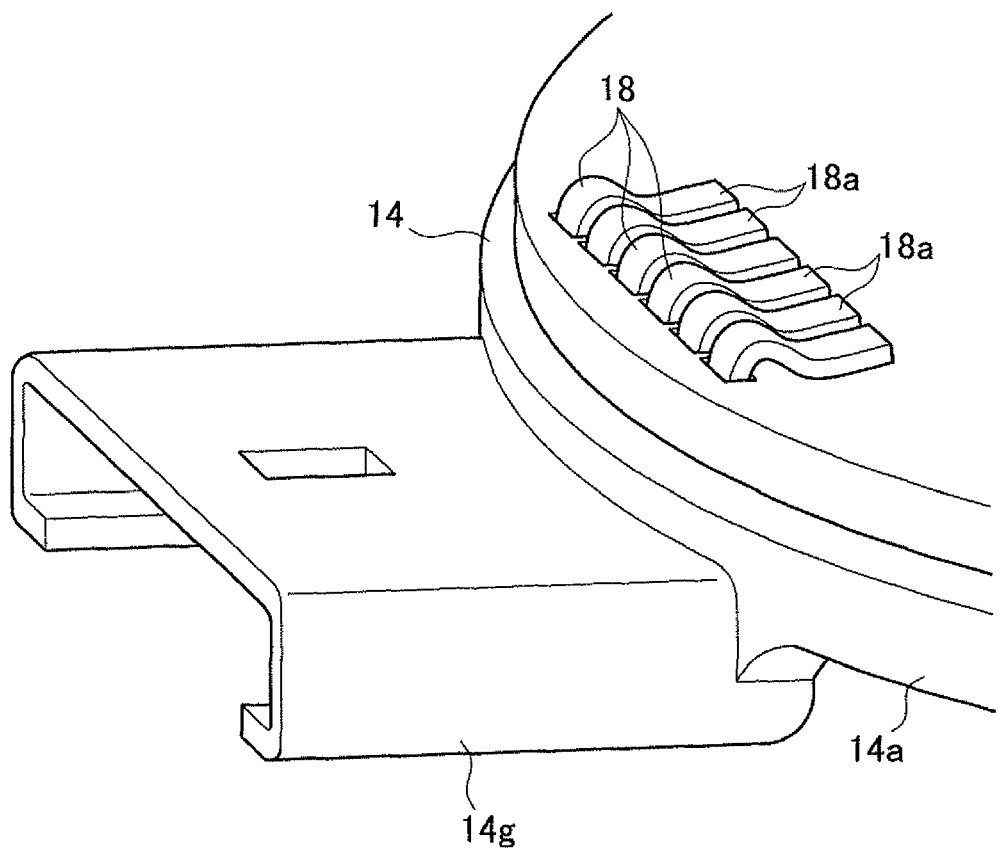
FIG. 11 is an enlarged perspective view showing a back side of the connector in the embodiment.
Figure 12:
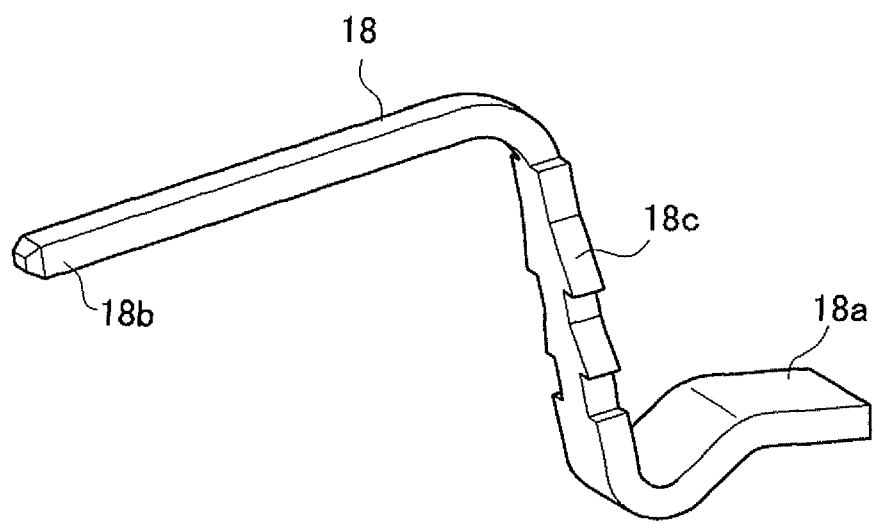
FIG. 12 is a perspective view of one of terminals assembled in the connector in the embodiment.

In addition, as shown in FIGS. 4 and 5, the circumferential wall 14a of the stator body 14 is integrally formed with a connector 14g located between two of the brackets 14e to radially outwardly extend. This connector 14g is attached with a plurality of terminals 18 connected to external windings respectively. FIG. 10 is an enlarged perspective view showing a front side of the connector 14g. FIG. 11 is an enlarged perspective view showing a back side of the connector 14g. FIG. 12 is a perspective view of one of the terminals 18 assembled in the connector 14g. As shown in FIG. 12, each terminal 18 is bent in a crank shape when assembled in the connector 14g. Each terminal 18 is formed of a rectangular rod material to have a wide internal electrode 18a at one end and a rod-like external electrode 18b at the other end. As shown in FIG. 10, the external electrode 18b of each terminal 18 is placed to protrude into the connector 14g. As shown in FIG. 11, the internal electrode 18a of each terminal 18 is placed in contact with the back surface of the stator body 14. As shown FIG. 12, each internal electrode 18a is bent at two points between its proximal end and middle end. Thus, each internal electrode 18a is designed in an elastic form having an elastic force in a distal end portion. Specifically, as shown in FIG. 11, while each terminal 18 is assembled in the connector 14g, the distal end portion of each internal electrode 18a are held in pressure contact with the back surface of the stator body 14 by own elastic force. To be more specific, the internal electrode 18a of each terminal 18 is placed in pressure contact with terminals 19a and 20a of a printed coil 19 for excitation and a printed coil 20 for detection provided in the stator body 14 as will be explained in detail later (see FIGS. 19 and 20). Herein, the internal electrode 18a of each terminal 18 has an elastic form and thus the terminals 18 are assembled in the stator body 14 respectively while exerting constant elastic force on respective internal electrodes 18a.

Figure 13:
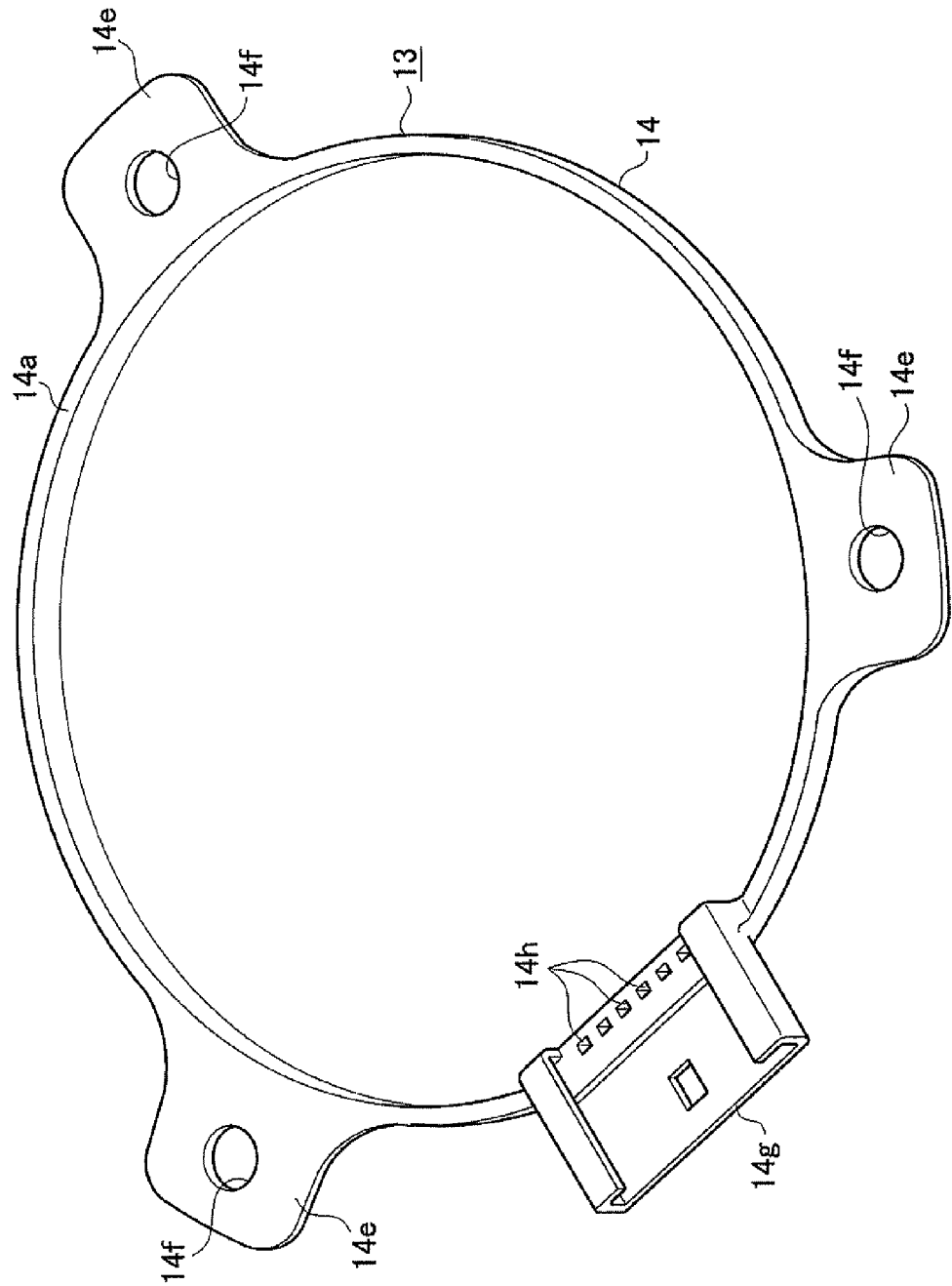
FIG. 13 is a perspective view showing a front side of the detection stator in which the terminals are not yet assembled in the embodiment.
Figure 14:
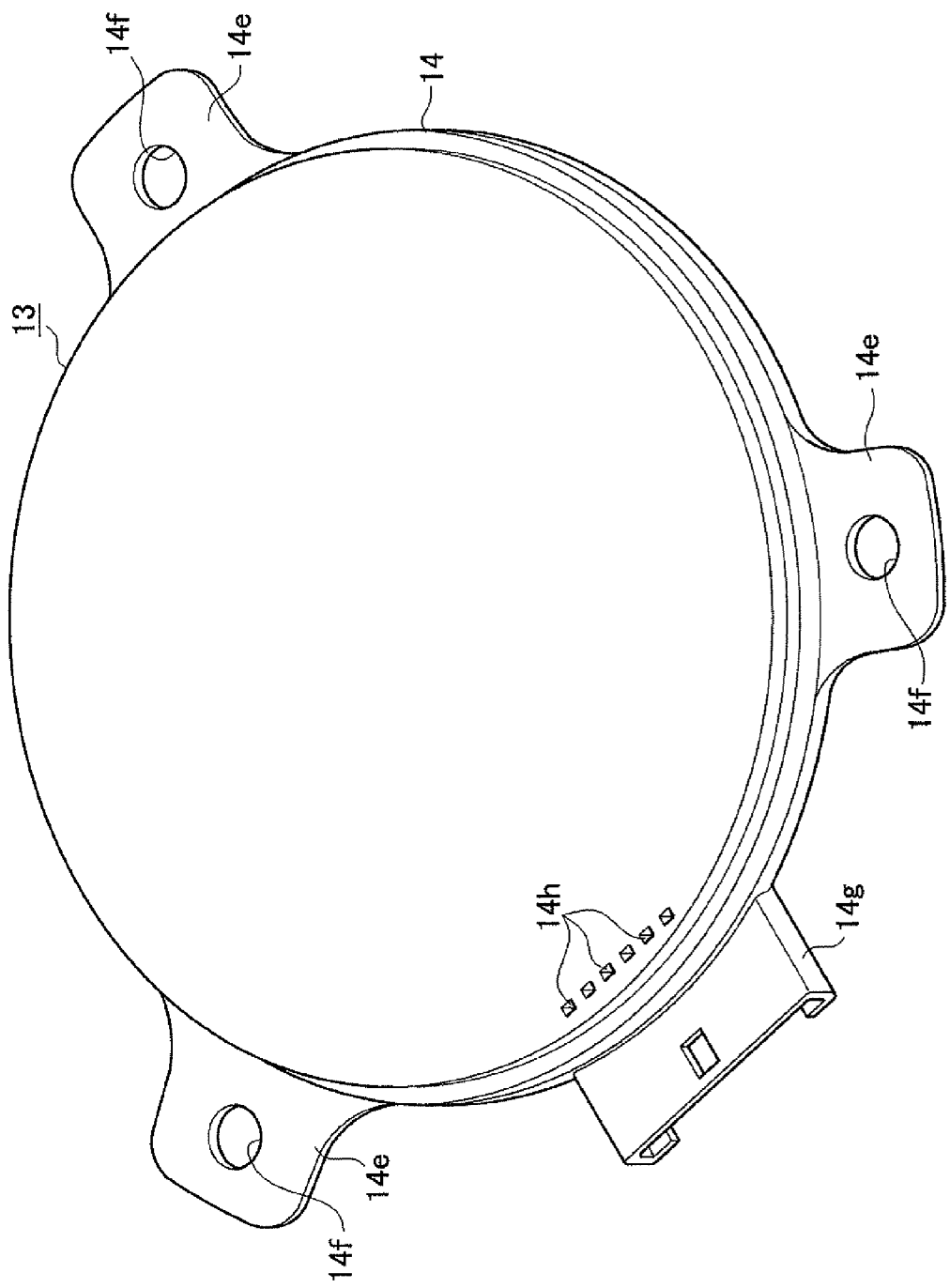
FIG. 14 is a perspective view showing a back side of the detection stator in which the terminals are not yet assembled in the embodiment.
Figure 15:
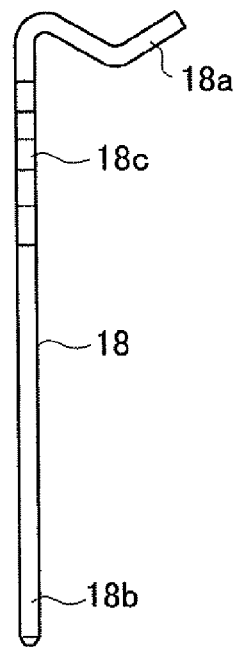
FIG. 15 is a front view of one of the terminals before being assembled in the stator body in the embodiment.
Figure 16:
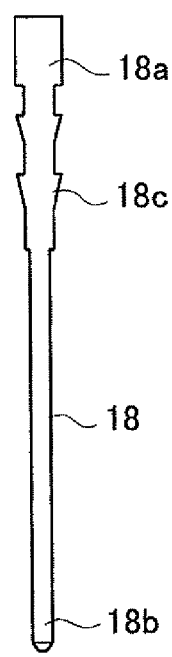
FIG. 16 is a left side view of the terminal shown in FIG. 15 in the embodiment.
Figure 17:
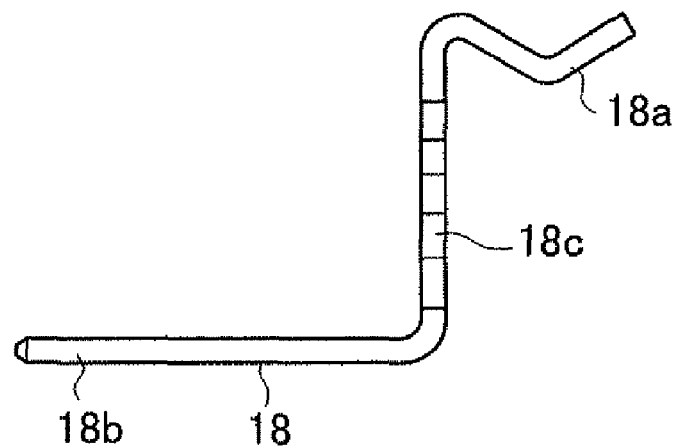
FIG. 17 is a front view of the terminal assembled in the stator body and bent therein in the embodiment.
Figure 18:
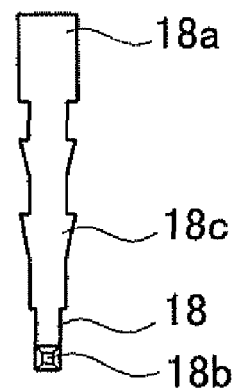
FIG. 18 is a left side view of the terminal shown in FIG. 17 in the embodiment.

The aforementioned terminals 18 are retrofitted onto the stator body 14 in a final manufacturing process of the detection stator 13. FIG. 13 is a perspective view showing a front side of the detection stator 13 in which the terminals 18 are not yet assembled. FIG. 14 is a perspective view showing a back side of the detection stator 13 in which the terminals 18 are not yet assembled. The stator body 14 is formed with a plurality of assembly holes 14h for assembling the terminals 18 in a root portion of the connector 14g. FIG. 15 is a front view of one of the terminals 18 before being assembled in the stator body 14. FIG. 16 is a left side view of the terminal 18 shown in FIG. 15. FIG. 17 is a front view of the terminal 18 assembled in the stator body 14 and bent therein. FIG. 18 is a left side view of the terminal 18 shown in FIG. 17. Each terminal 18 has a wedge portion 18c having a multistage wedge shape continuous with the internal electrode 18a. This wedge portion 18c is engaged with the inner surface of the assembly hole 14h of the stator body 14. While each terminal 18 is in an unbent state shown in FIGS. 15 and 16, the external electrode 18b is inserted, from the external electrode 18b side, into the hole 14h from the back side of the stator body 14. Then, the proximal end portion of each external electrode 18b is bent at a right angle on the front side of the connector 14g into such a bent form as shown in FIGS. 12, 17, and 18.

Figure 19:
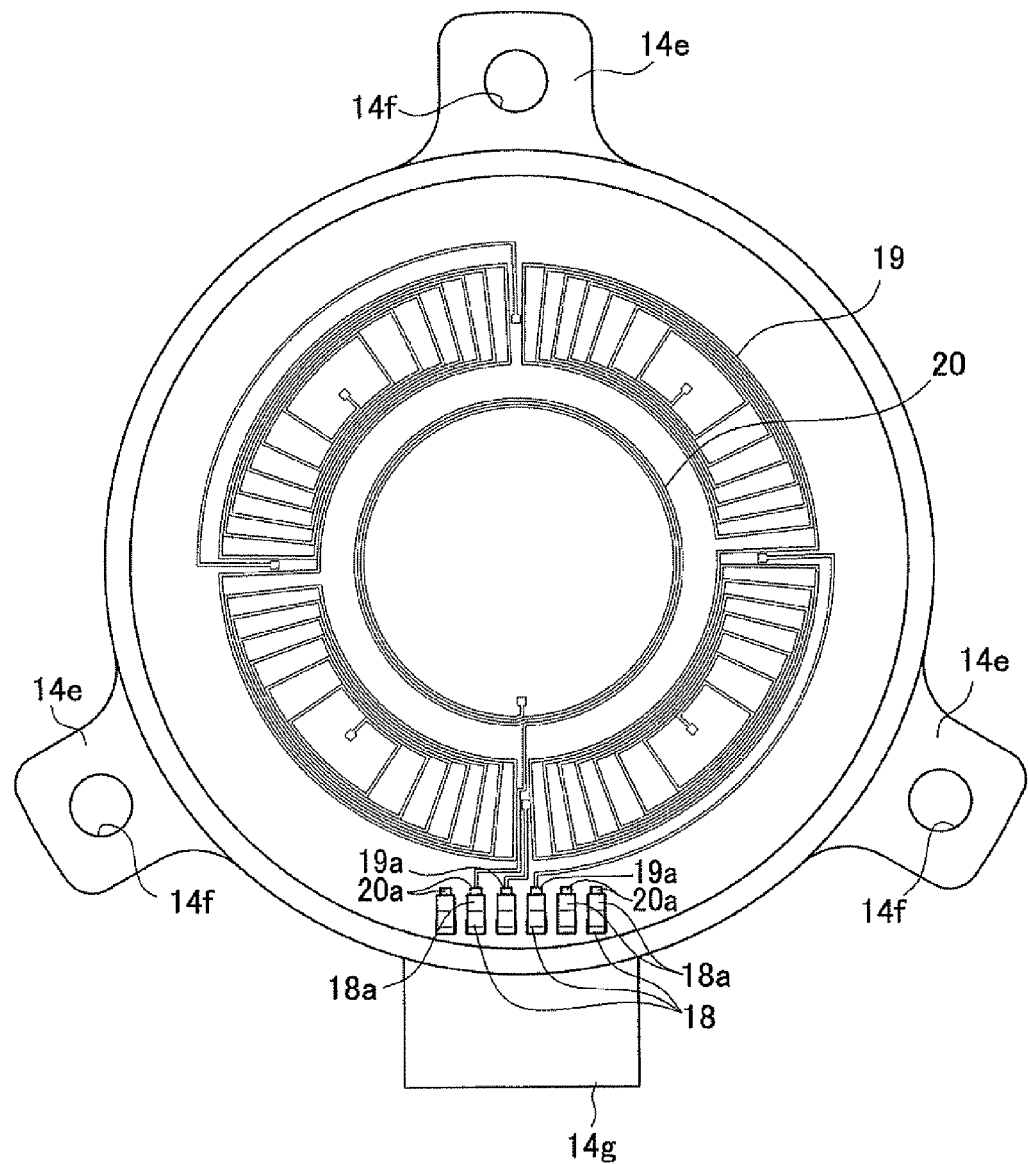
FIG. 19 is a plan view showing a back side of the detection stator in the embodiment.
Figure 20:
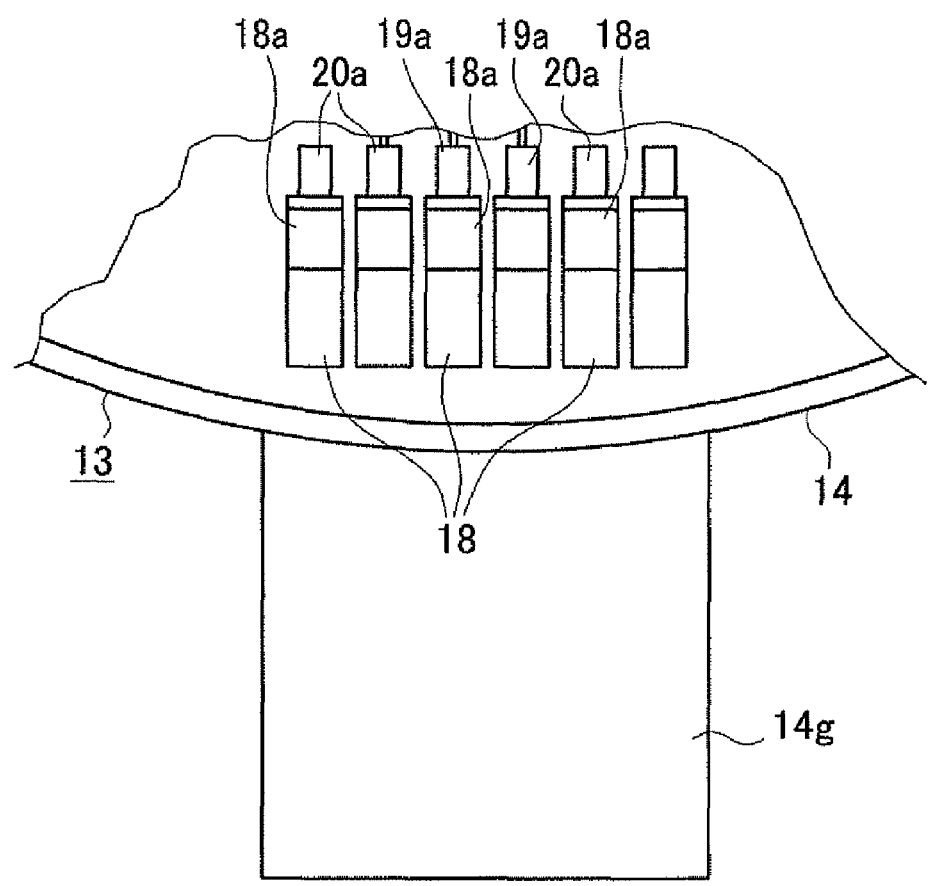
FIG. 20 is an enlarged plan view of connecting portions of the connector and internal electrodes in FIG. 19.

FIG. 19 is a plan view showing a back side of the detection stator 13. FIG. 20 is an enlarged plan view of connecting portions (a connecting state) of the connector 14g and the internal electrodes 18a in FIG. 19. As shown in FIGS. 19 and 20, the back side of the detection stator 13 is provided with the printed coil 19 for excitation and the printed coil 20 for detection respectively in almost circular form. The printed coil 20 for detection is placed on the inner side of the printed coil 19 for excitation. The printed coil 19 for excitation includes different two patterns. These two patterns are formed to overlap one on another through an insulation film or coating (not shown) so that respective phases are shifted 90 degrees from each other. These two types of printed coils 19 and 20 are covered and protected with thin insulation film or coating (not shown). The terminals 19a and 20a of the printed coils 19 and 20 are electrically connected to the internal electrodes 18a of the terminals 18 individually in pressure contact relation. In this connecting state, on the outer side of the each printed coil 19 and 20 and the detection rotor 12, the internal electrodes 18a of the terminals 18 are individually connected to the terminals 19a and 20a of the printed coils 19 and 20.

Figure 21:
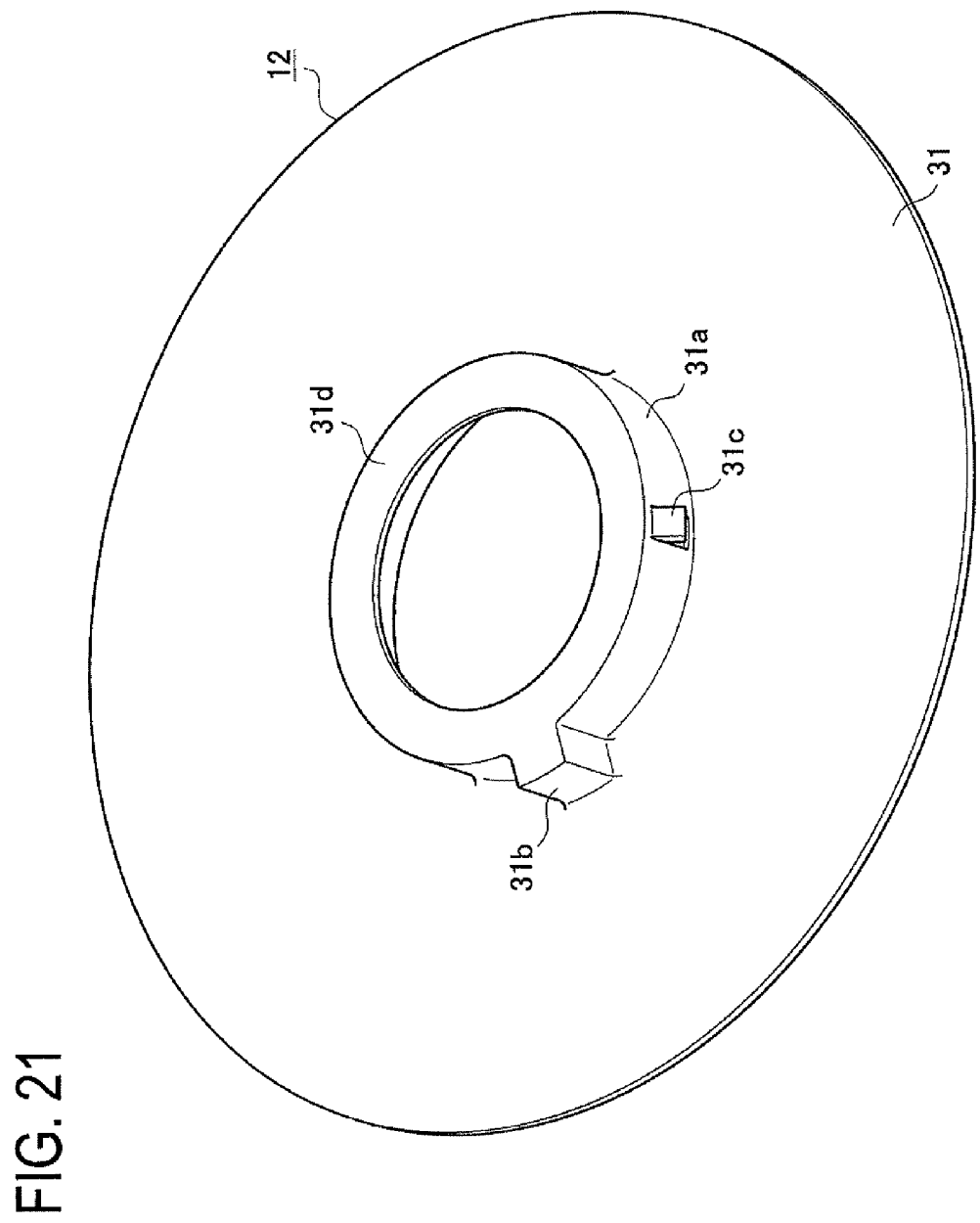
FIG. 21 is a perspective view showing a back side of a detection rotor in the embodiment.
Figure 22:
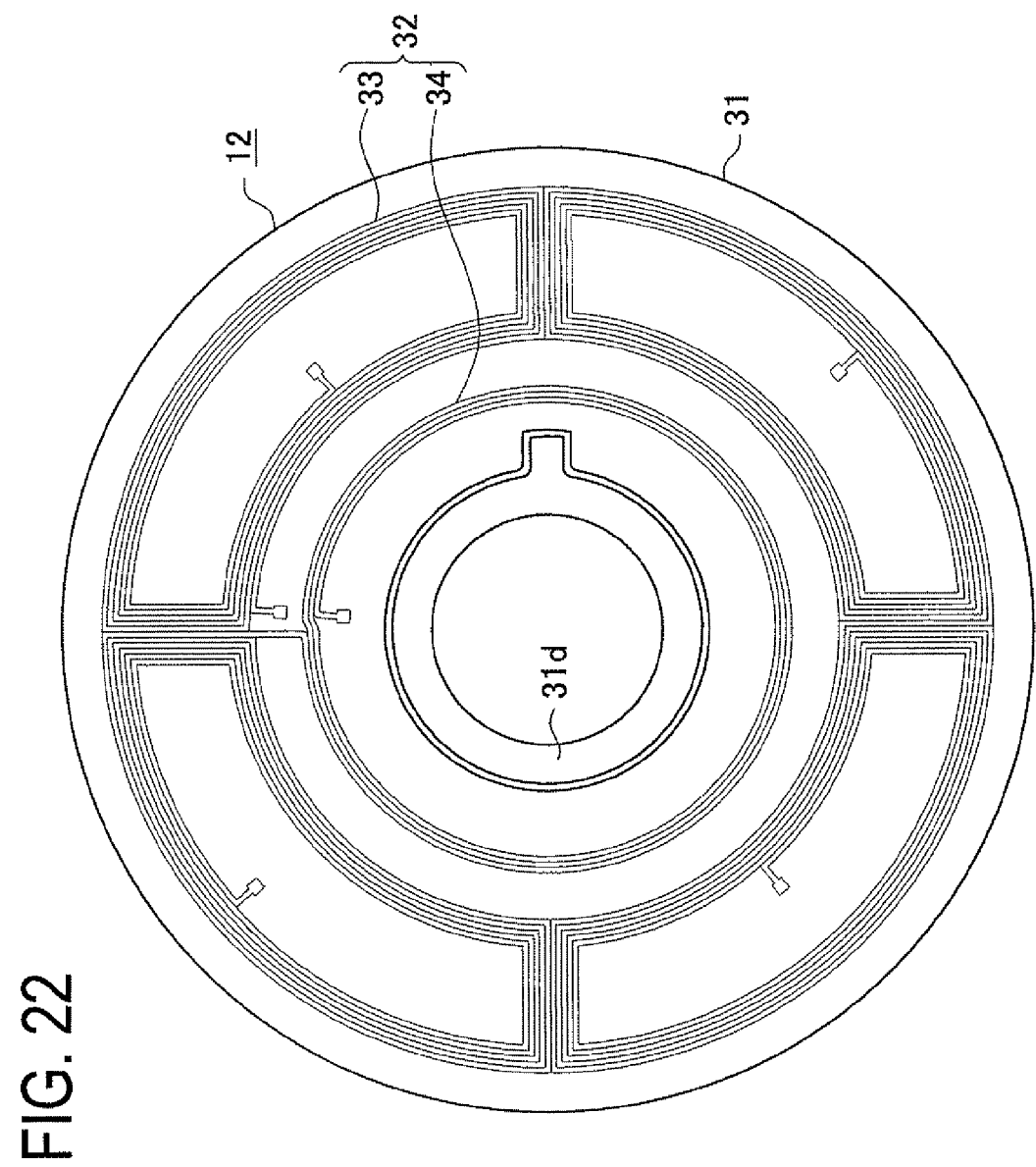
FIG. 22 is a plan view showing a front side of the detection rotor in the embodiment.

The detection rotor 12 is explained below. FIG. 21 is a perspective view showing a back side of the detection rotor 12. FIG. 22 is a plan view showing a front side of the detection rotor 12. As shown in FIGS. 3, 21, and 22, the detection rotor 12 includes an almost circular plate 31 and a coil 32 provided on the surface of the plate 31. The detection rotor 12 is fixed to the end of the motor shaft 5 through the plate 31 which is a base material.

As shown in FIG. 22, the coil 32 provided on the surface of the plate 31 includes a rotary pattern 33 and a rotary transfer pattern 34, each being formed as an almost circular thin film or layer. These patterns 33 and 34 are formed by printing silver paste on the surface of the plate 31. The patterns 33 and 34 are respectively formed in such a way that a thin insulation film (not shown) made of polyimide is formed on the surface of the plate 31 and then the patterns 33 and 34 are formed on the insulation film serving as a base layer of the patterns 33 and 34. The insulation film serving as the base layer may be omitted. The surface of each pattern 33 and 34 is covered and protected with an insulation film (not shown) similarly made of polyimide.

Figure 23:
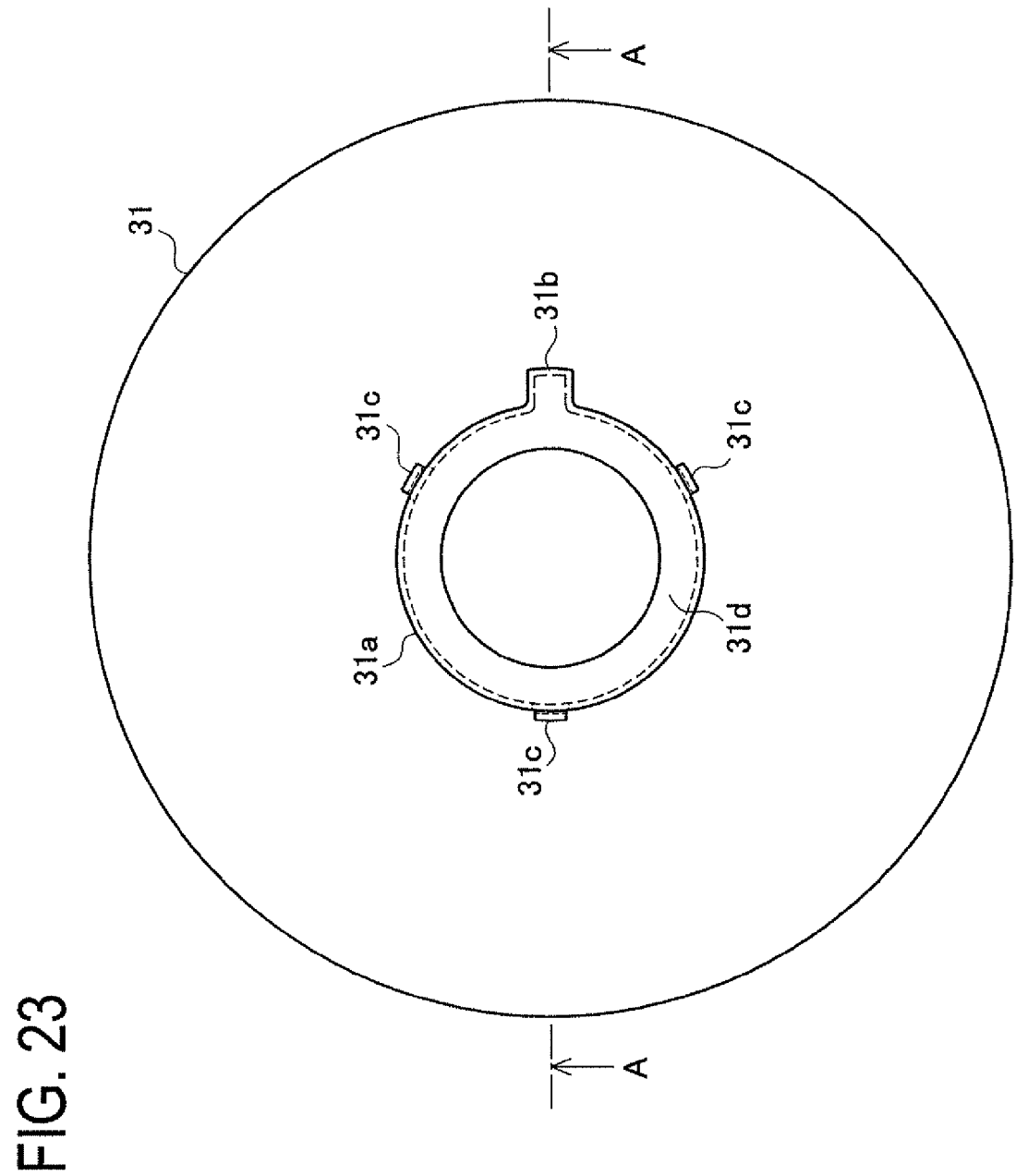
FIG. 23 is a plan view showing a back side of a plate of the detection rotor in the embodiment.
Figure 24:
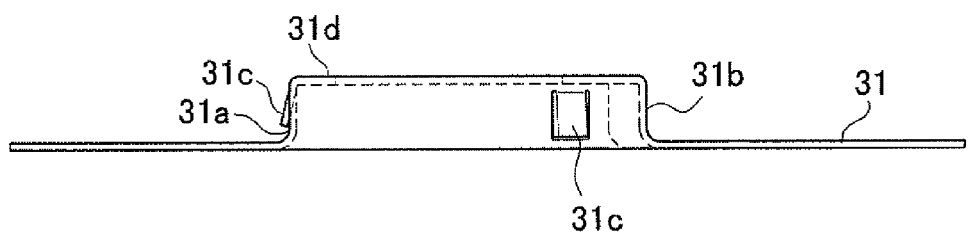
FIG. 24 is a front view of the plate shown in FIG. 23 in the embodiment.
Figure 25:
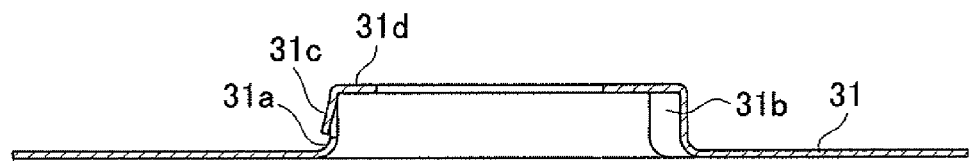
FIG. 25 is a cross sectional view of the plate taken along a line A-A in FIG. 23 in the embodiment.

FIG. 23 is a plan view showing a back side of the plate 31 of the detection rotor 12. FIG. 24 is a front view of the plate 31 shown in FIG. 23. FIG. 25 is a cross sectional view of the plate 31 taken along a line A-A in FIG. 23. The plate 31 is made of a metal material in a circular disc shape, and integrally formed with a cylindrical portion 31a protruding on the back side in the center thereof. As shown in FIGS. 21 to 25, the cylindrical portion 31a is integrally formed, on its outer periphery, with a single key 31b axially extending. This key 31b is designed to conform to a key groove 5b (see FIGS. 3, 26, and 27) formed in the opening 5a of the motor shaft 5. As shown in FIGS. 23 to 27, furthermore, the cylindrical portion 31a is formed, on its outer periphery, with three engagement lugs 31c spaced at equally angular intervals. Each of these engagement lugs 31c is formed by making a cut in and turning a part of the peripheral wall of the cylindrical portion 31a radially outward. The outside diameter of the cylindrical portion 31a is determined to be slightly larger than the inside diameter of the opening 5a of the motor shaft 5. Furthermore, an end (an upper end in FIGS. 24 and 25) of the cylindrical portion 31a is integrally formed with an inward flange 31d. The aforementioned plate 31 is made of a predetermined metal plate into the aforementioned shape by mechanical process. Even though having nonmagnetic characteristics before the mechanical process, some metal materials may be magnetized because the metal is transformed into martensite after the mechanical process. In this embodiment, the plate 31 is made of a nonmagnetic, metal material capable of maintaining the nonmagnetic characteristics even after it is machined into the aforementioned predetermined shape. As this metal material, for example, "SUS305", which is a stainless steel containing 17-19% chromium, 10.5-13% nickel, 2% or less manganese, and 0.12% or less carbon, may be used.

Figure 26:
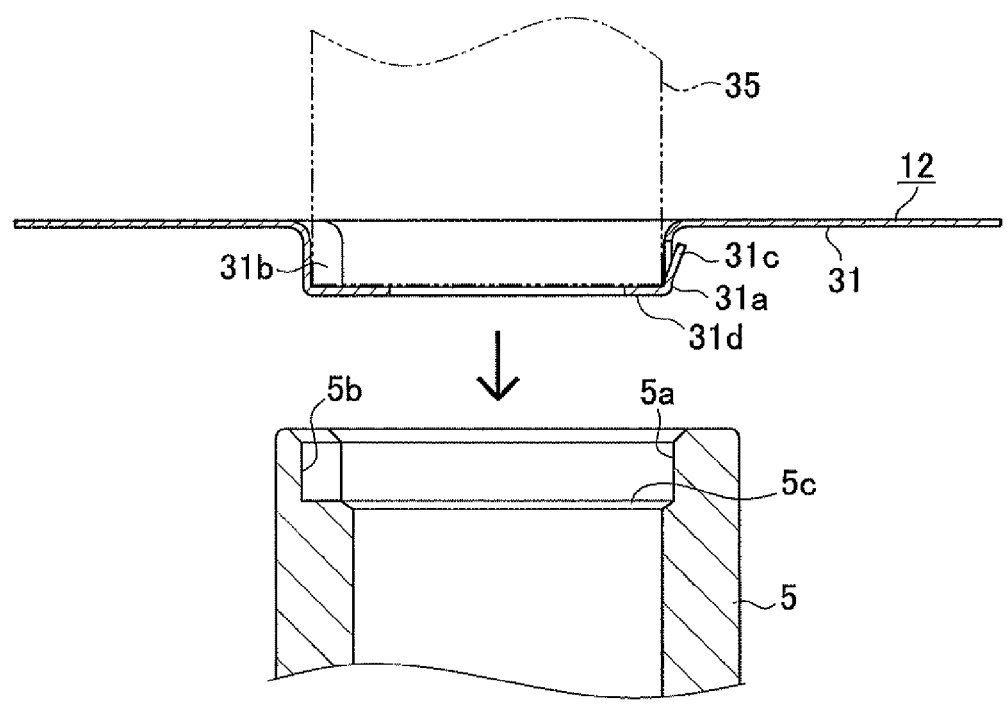
FIG. 26 is a cross sectional view showing a process for fixing the detection rotor to an end of a motor shaft in the embodiment.
Figure 27:
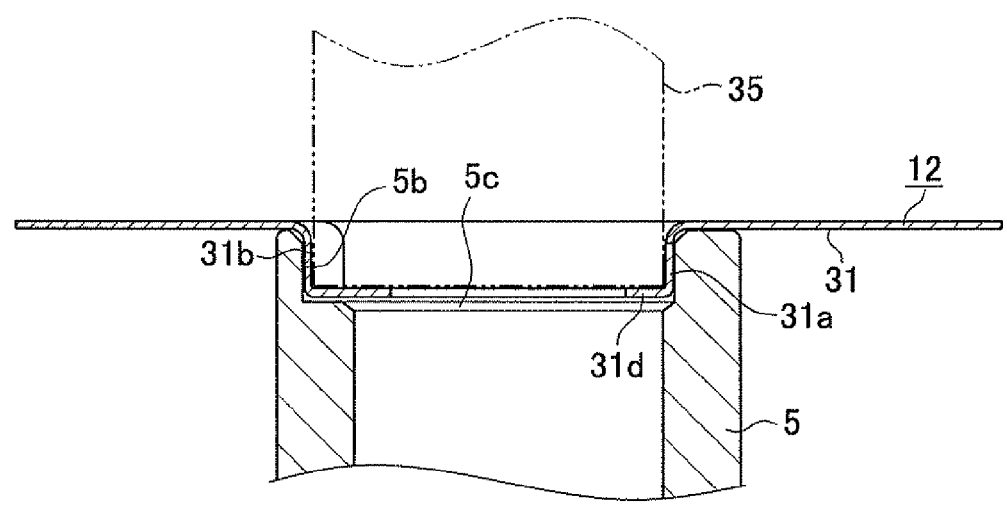
FIG. 27 is another cross sectional view showing the process for fixing the detection rotor to the end of the motor shaft in the embodiment.

FIGS. 26 and 27 are cross sectional views showing a process for fixing the detection rotor 12 configured as above to the end of the motor shaft 5. As shown in FIGS. 26 and 27, a portion of the opening 5a of the motor shaft 5 is formed with a larger inside diameter than other portions to form a shoulder portion 5c in which the key groove 5b is formed. This shoulder portion 5c may be omitted. To fix the detection rotor 12 to the motor shaft 5, firstly, the cylindrical portion 31a of the plate 31 of the detection rotor 12 is aligned with the opening 5a of the motor shaft 5 so that the key 31b of the cylindrical portion 31a is aligned with the key groove 5b as shown in FIG. 26. At that time, a cylindrical jig 35 is fitted in the cylindrical portion 31a. The cylindrical portion 31a is then press-fitted in the opening 5a of the motor shaft 5 as shown in FIG. 27. At the time, the inward flange 31d is pressed by an end portion of the jig 35 into the opening 5a. This press-fitting is continued until the plate 31 comes into contact with the end of the motor shaft 5. The plate 31 is fixed to the end of the motor shaft 5 in this way and thus the detection rotor 12 can be fixed to the end of the motor shaft 5.

In this fixed state, the plate 31 of the detection rotor 12 contacts with the end of the motor shaft 5 and therefore the detection rotor 12 can be positioned in place in an axial direction with respect to the end of the motor shaft 5. Since the key 31b of the cylindrical portion 31a of the plate 31 is engaged in the key groove 5b of the opening 5a of the motor shaft 5, the detection rotor 12 can be held against rotation with respect to the motor shaft 5 and can be rotated integral with the motor shaft 5.

Herein, to provide the rotation detector 11 in the motor 1, the detection rotor 12 is firstly fixed to the motor shaft 5 as described above. Then, the detection stator 13 is placed in the recessed portion 7a of the end plate 7 to cover the detection rotor 12. The brackets 14e of the stator body 14 are fastened respectively to the end plate 7 with the bolts 16. At this time, the plate spring washers 17 are individually between the bolts 16 and the brackets 14e. In this way, the rotation detector 11 is retrofitted onto the motor 1 and thus the motor 1 including the rotation detector 11 is produced.

As explained above, according to the structure of the rotation detector-equipped motor 1 in this embodiment, the detection rotor 12 fixed to the motor shaft 5 and the detection stator 13 fixed to the end plate 7 of the motor case 2 with the bolts 16 are placed to face each other with the predetermined clearance therebetween. When the detection rotor 12 is rotated integral with the motor shaft 5, the rotation angle of the motor shaft 5 is detected by cooperation of the detection rotor 12 and the detection stator 13. More details of the operation of the rotation detector 11 are omitted herein.

Herein, the stator body 14 constituting the detection stator 13 is molded of resin, which may cause creep in the stator body 14 due to heat and deteriorate the stator body 14. However, as shown in FIG. 9, the plate spring washers 17 are individually placed between the bolts 16 and the brackets 14e of the stator body 14 and hence the creep of the stator body 14 and others are absorbed by the elasticity of the plate spring washers 17. Since each plate spring washer 17 is formed with the protrusions 17b in a contact portion with respect to the corresponding brackets 14e, the engagement of the protrusions 17b with each bracket 14e restricts displacement of the detection stator 13. It is accordingly possible to prevent the detection stator 13 from causing displacement due to creep and deterioration, appropriately keep the positional relationship between the detection stator 13 and the detection rotor 12, and ensure detection accuracy of the rotation angle by the rotation detector 11.

According to the present embodiment, the detection stator 13 is placed in the recessed portion 7a of the end plate 7, so that the detection stator 13 does not protrude from the motor case 2. This makes it possible to prevent the rotation detector 11 from protruding from the motor case 2, thus achieving a reduced size of the entire rotation detector-equipped motor 1.

In this embodiment, since the rotation detector 11 is placed on the outer side of the motor case 2, the rotation detector 11 can be retrofitted onto the motor 1 after manufacture of the motor 1. It is also possible to handle the rotation detector 11 without disassembling the motor 1. Accordingly, the motor 1 can be manufactured separately from the rotation detector 11. Adjustment, repair, replacement, and others of the rotation detector 11 can be performed without disassembling the motor 1. In particular, zero point adjustment related to the rotation angle of the rotation detector 11 can be more facilitated as compared with the case where the rotation detector is provided in the motor.

According to the present embodiment, the internal electrode 18a of each terminal 18 provided in the connector 14g of the stator body 14 to serve as the connecting part with the printed coil 19 for excitation and the printed coil 20 for detection is shaped in an elastic form. Accordingly, the internal electrodes 18a are placed in pressure contact with the terminals 19a and 20a of the printed coils 19 and 20 by the elastic force. As a result, even when each terminal 18 expands and contracts due to heat, each terminal 18 is kept in contact with the corresponding printed coil 19 or 20. In other words, the internal electrodes 18a of the terminals 18 are held in one-to-one contact with the terminals 19a and 20a of the printed coils 19 and 20. Thus, the conducting state between the terminals 18 and the printed coils 19 and 20 can be always ensured. Since the internal electrodes 18a of the terminals 18 are connected to the terminals 19a and 20a of the printed coils 19 and 20 outside of the outer periphery of each printed coil 19 and 20 and the detection rotor 12, the detection rotor 12 and each terminal 18 do not interfere with each other.

According to the present embodiment, the printed coils 19 and 20 are provided in the stator body 14 and then the terminals 18 are allowed to be assembled in the assembly holes 14h of the connector 14g of the stator body 14. In this assembled state, the wedge portion 18c of each terminal 18 is engaged with the inner surface of the corresponding hole 14h, thus holding the internal electrode 18a in a state of being exerted with a constant elastic force. Accordingly, it is unnecessary to insert mold each terminal 18 in advance into the stator body 14. The printed coils 19 and 20 can be easily provided in the stator body 14 without being restricted by each terminal 18.

According to the present embodiment, the plate 31 constituting the detection rotor 12 is fixed to the end of the motor shaft 5 and hence the detection rotor 12 is fixed to the end of the motor shaft 5. Consequently, the detection rotor 12 is positioned in place in the axial direction in the end of the motor shaft 5, no additional positioning member is required as compared with the case of positioning the detection rotor 12 on the outer periphery of the motor shaft 5. This can reduce the number of components just as much as a positioning member for the detection rotor 12 is omitted, thus avoiding the size increase of the entire rotation detector 11.

According to the present embodiment, the cylindrical portion 31a of the plate 31 constituting the detection rotor 12 is press-fitted in the opening 5a of the motor shaft 5 and hence the detection rotor 12 is fixed to the end of the motor shaft 5. Therefore, a specific fixing member for fixing the detection rotor 12 is omitted and such fixing member does not need to be provided on the outer periphery of the motor shaft 5. This makes it possible to further reduce the number of components just as much as the fixing member is omitted, thus achieving a simplified periphery of the motor shaft 5.

According to the present embodiment, the plate 31 constituting the detection rotor 12 is non-magnetic and accordingly the detection rotor 12 is less likely to be affected by magnetic noise of the motor 1. In this regard, the detection accuracy of the rotation angle by the rotation detector 11 can be enhanced.

In the present embodiment, to fix the detection rotor 12 to the end of the motor shaft 5, the cylindrical portion 31a of the plate 31 constituting the detection rotor 12 is press-fitted in the opening 5a of the motor shaft 5. Furthermore, for such press-fitting, the inward flange 31d of the cylindrical portion 31a is pressed by the jig 35. During press-fitting, therefore, excessive stress is not exerted on an insulation film of the detection rotor 12 and the rotary pattern 33 and the rotary transformer pattern 34, thereby preventing damages on the insulation film and the rotary pattern 33 and the rotary transformer pattern 34.

It is to be understood that the present invention is not limited to the above embodiment and may be embodied in other specific forms without departing from the essential characteristics thereof.

Figure 28:
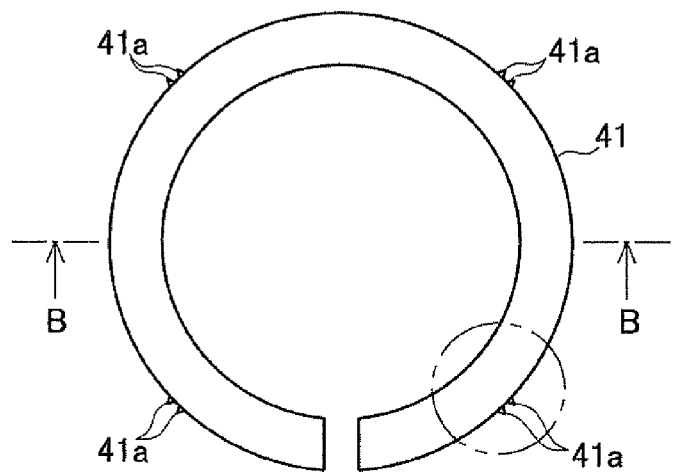
FIG. 28 is a plan view of a C-shaped spring washer in a modified example.
Figure 29:
FIG. 29 is a cross sectional view of the C-shaped spring washer taken along a line B-B in FIG. 28 in the modified example.
Figure 30:
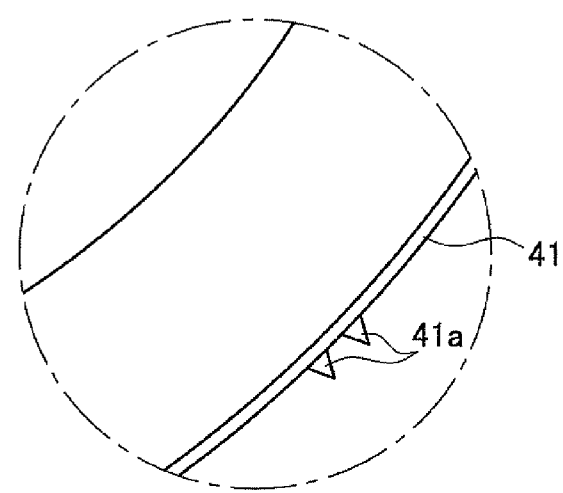
FIG. 30 is an enlarged plan view of a part of the C-shaped spring washer shown in FIG. 28 in the modified example.

In the above embodiment, the plate spring washers 17 are placed as the elastic elements between the brackets 14e of the stator body 14 and the end plate 7. As an alternative, a C-shaped spring washer 41 shown in FIGS. 28 to 30 may be provided as the elastic element. FIG. 28 is a plan view of this C-shaped spring washer 41. FIG. 29 is a cross sectional view of this washer 41 taken along a line B-B in FIG. 28. FIG. 30 is an enlarged plan view of a part of the C-shaped spring washer 41 shown in FIG. 28. As shown in FIGS. 28 to 30, the C-shaped spring washer 41 has a C-shape and acute-angled protrusions 41a arranged in pairs at four places on the outer periphery. These protrusions 41a can stick in and engage with the inner peripheral surface of the bolt hole 14f of the bracket 14e of the stator body 14.

Figure 31:
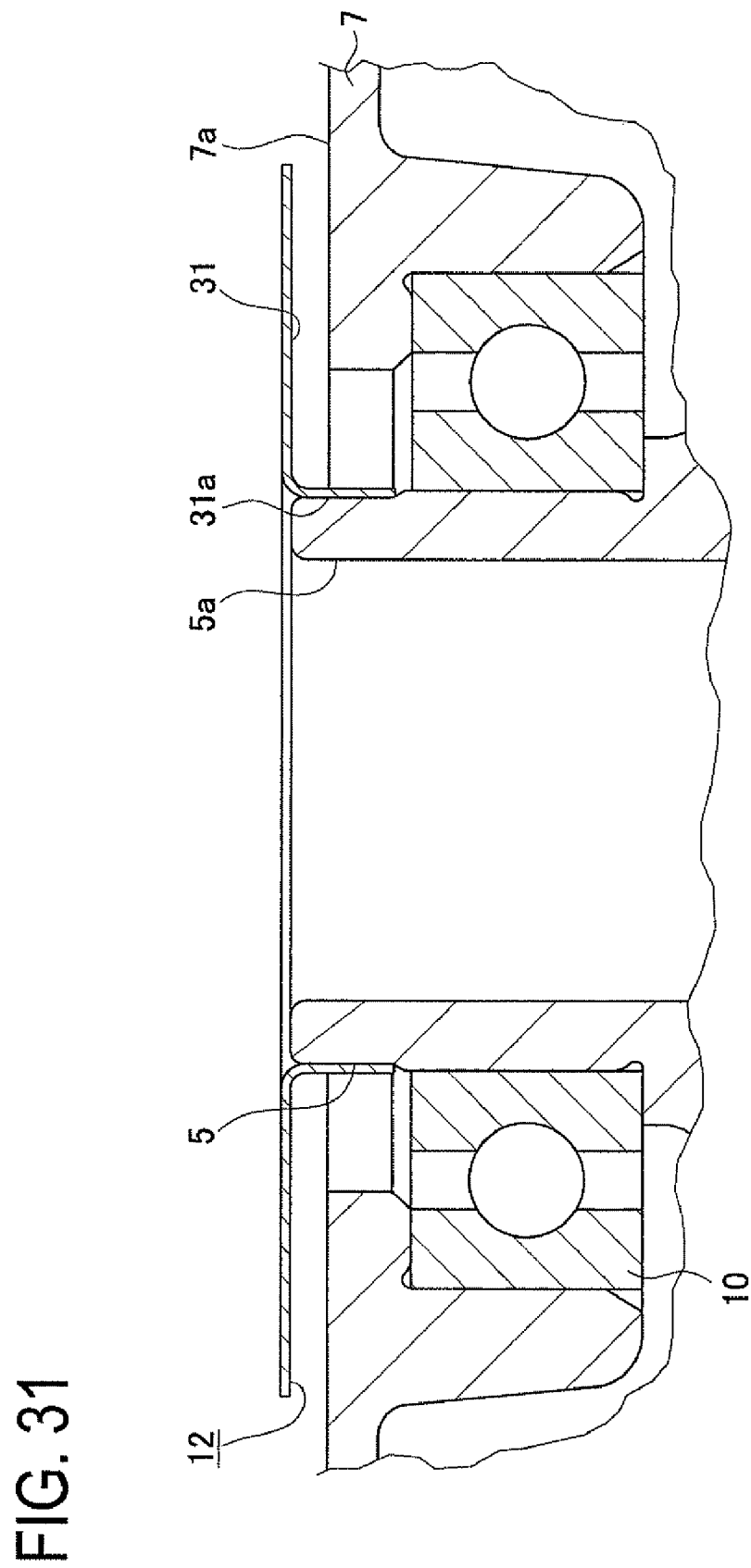
FIG. 31 is an enlarged cross sectional view showing a part including the detection rotor in the modified example.

In the above embodiment, the cylindrical portion 31a of the plate 31 constituting the detection rotor 12 is press-fitted in the opening 5a in the end of the motor shaft 5 to fix the detection rotor 12 to the end of the motor shaft 5. As an alternative, as shown in a cross sectional view in FIG. 31, the cylindrical portion 31a of the plate 31 may be fitted on the outer periphery of the end of the motor shaft 5 to fix the detection rotor 12 to the end of the motor shaft 5.

In the above embodiment, the detection rotor 12 is fixed to the end of the motor shaft 5. An alternative is to fix the detection rotor onto the outer periphery of the end of the motor shaft.

Figure 32:
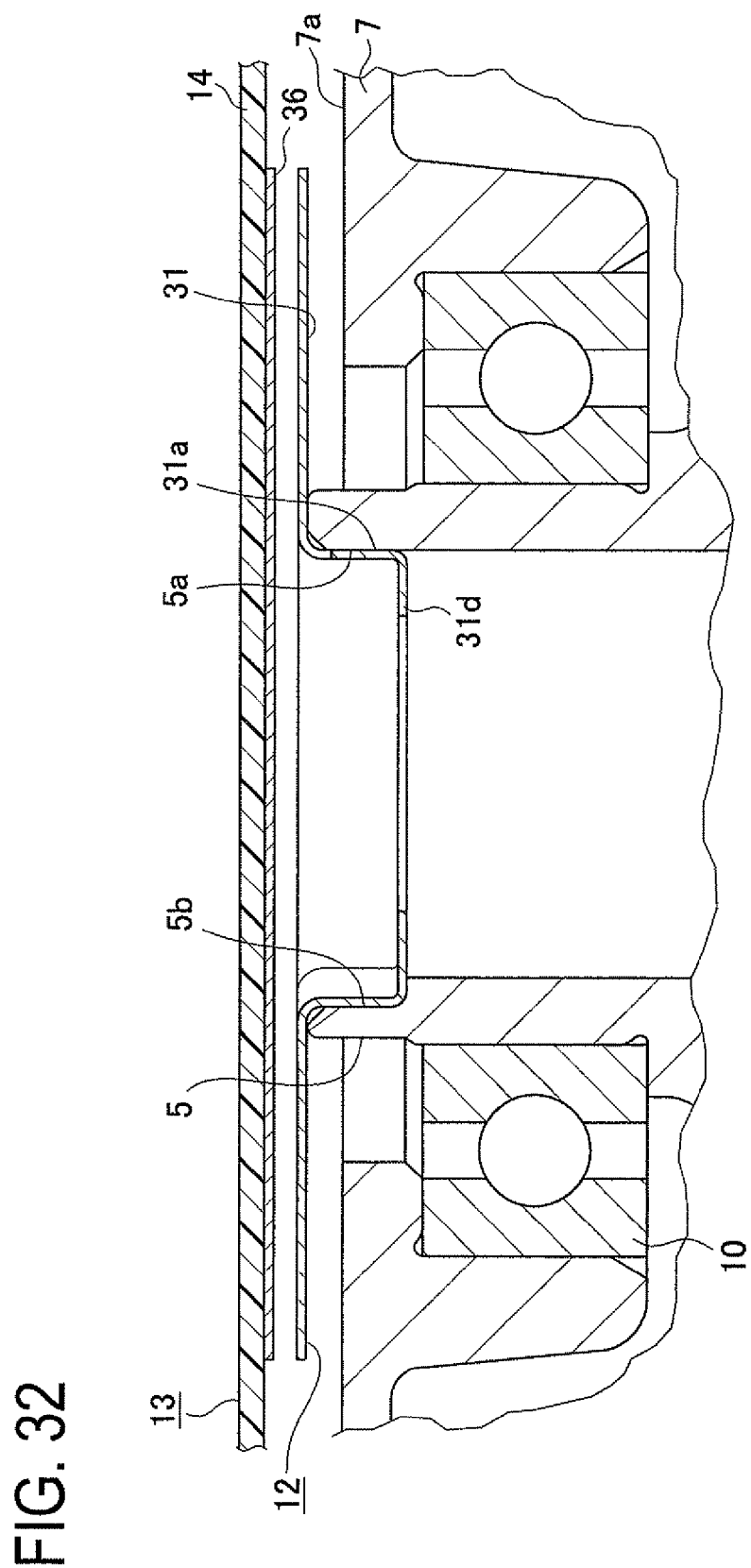
FIG. 32 is another enlarged cross sectional view showing a part including the rotation detector in the modified example.

In the above embodiment, the plate 31 made of a non-magnetic metal material (SUS305) is provided as a base material in only the detection rotor 12. As an alternative, as shown in a cross sectional view in FIG. 32, the plate 31 made of a non-magnetic metal material (SUS305) is provided as a base material in the detection rotor 12 and further a plate 36 made of a non-magnetic metal material (SUS305) may be provided as a base material in the stator body 14 of the detection stator 13. In this case, on the detection stator 13, an insulation film (not shown) in a thin film form is formed on the surface of the plate 36 and then, on the insulation film serving as a base layer, a printed coil (not shown) and an insulation film (not shown) covering the printed coil are provided (the insulation film serving as the base layer may be omitted). In this case, both the detection rotor 12 and the detection stator 13 are reinforced by the plates 31 and 36 made of the non-magnetic metal material (SUS305) and thus are less affected by magnetic noise of the motor 1. Consequently, the detection accuracy of the rotation angle by the rotation detector 11 can be enhanced.

In the above embodiment, the plate 31 made of the non-magnetic material (SUS305) is provided as the base material in only the detection rotor 12. As an alternative, a plate made of the non-magnetic material (SUS305) may be provided in only the stator body of the stator. In this case, the detection stator is provided with a printed coil and an insulation film covering it on a plate. In this case, the detection stator is reinforced by a plate made of a non-magnetic material (SUS305) and is less affected by magnetic noise of the motor. Consequently, the detection accuracy of rotation angle by the rotation detector can be enhanced.

In the above embodiment, one end of the motor shaft 5 is formed to slightly protrude out of the motor case 2. Alternatively, the end of the motor shaft may be formed not to protrude out of the motor case. In this case, the motor case is formed with a hole at the center so that the end of the motor shaft is visible from the hole.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The present invention can be applied to a motor for use in for example a hybrid electric vehicle and an electric vehicle.

REFERENCE SIGNS LIST

1 Rotation detector-equipped motor
2 Motor case
5 Motor stator
5a Opening (Recess)
11 Rotation detector
12 Detection rotor
13 Detection stator
31 Plate (Non-magnetic metal material)
31a Cylindrical portion
32 Coil
36 Plate (Non-magnetic metal material)

The invention claimed is:

1. A structure of a rotation detector-equipped motor comprising:
a rotation detector including a detection rotor and a detection stator placed to face the detection rotor, wherein
the motor includes a motor case and a motor shaft,
the detection rotor includes a plate and a coil provided on the plate,
the plate is fixed to a furthest end of the motor shaft,
the motor shaft includes a recess in the furthest end,
the plate has a circular disc shape and includes a cylindrical portion located in the center and protruding on a back side, and
the cylindrical portion is press-fitted in the recess of the motor shaft and the plate is fixed to the furthest end of the motor shaft.

2. The structure of a rotation detector-equipped motor according to claim 1, wherein
the cylindrical portion is formed, on an outer periphery thereof, with a key extending in an axial direction, and the recess of the motor shaft is formed with a key groove conforming to the key.

3. The structure of a rotation detector-equipped motor according to claim 1, wherein the cylindrical portion is formed, on an outer periphery thereof, with a plurality of engagement lugs turned outward.

4. The structure of a rotation detector-equipped motor according to claim 1, wherein the cylindrical portion is formed, at an end thereof, with an inward flange.

5. The structure of a rotation detector-equipped motor according to claim 1, wherein the plate is made of a non-magnetic material.

6. The structure of a rotation detector-equipped motor according to claim 5, wherein the plate is made of a metal material capable of maintaining a non-magnetic property even after processed into a predetermined shape.

7. The structure of a rotation detector-equipped motor according to claim 1, wherein at least one of the detection rotor and the detection stator includes a base material made of a non-magnetic metal material.

8. A method of manufacturing the structure of a rotation detector-equipped motor set forth in claim 4, comprising:
pressing the inward flange by an end portion of a jig to press-fit the cylindrical portion in the recess and bring the plate into contact with the end of the motor shaft.

9. A structure of a rotation detector-equipped motor comprising:
a rotation detector including a detection rotor and a detection stator placed to face the detection rotor, wherein
the motor includes a motor case and a motor shaft,
the detection rotor includes a plate and a coil provided on the plate,
the plate is fixed to a furthest end of the motor shaft,
the detection rotor has a plane surface portion on which the coil is formed, and the plane surface has a position outer than the furthest end of the motor shaft in an axial direction of the motor shaft.

10. The structure of a rotation detector-equipped motor according to claim 1, wherein
the detection stator is fixed to the motor case, and
the detection stator includes a plane surface portion on which a stator coil is formed, a circumferential wall formed on an outer circumference of the plane surface portion, and a plurality of brackets extending outwardly from the circumferential wall.

11. The structure of a rotation detector-equipped motor according to claim 10, wherein the detection stator is formed of a resin.

12. The structure of a rotation detector-equipped motor according to claim 10, wherein the detection stator includes a connector portion extending outwardly from the circumferential wall, and the connector portion includes a terminal electrically connected to the stator coil.

13. A structure of a rotation detector-equipped motor comprising a rotation detector including a detection rotor and a detection stator placed to face the detection rotor,
wherein the motor includes a motor case and a motor shaft,
the detection rotor is fixed to the motor shaft,
the detection stator is fixed to the motor case, and
the detection stator includes a plane surface portion on which a stator coil is formed, a circumferential wall formed on an outer circumference of the plane surface portion, and a plurality of brackets extending outwardly from the circumferential wall.

14. The structure of a rotation detector-equipped motor according to claim 13, wherein the detection rotor includes a plate and a rotor coil provided on the plate.

15. The structure of a rotation detector-equipped motor according to claim 13, wherein the detection stator is formed of a resin.

16. The structure of a rotation detector-equipped motor according to claim 13, wherein each of the plurality of brackets has a bolt hole, and the detection stator is fixed to the motor case with bolts.

17. The structure of a rotation detector-equipped motor according to claim 13, wherein the detection stator includes a connector portion extending outwardly from the circumferential wall, and the connector portion includes a terminal electrically connected to the stator coil.

18. The structure of a rotation detector-equipped motor according to claim 9, wherein
the detection stator is fixed to the motor case, and
the detection stator includes a plane surface portion on which a stator coil is formed, a circumferential wall formed on an outer circumference on the plane surface portion, and a plurality of brackets extending outwardly from the circumferential wall.

19. The structure of a rotation detector-equipped motor according to claim 18, wherein the detection stator is formed of a resin.

20. The structure of a rotation detector-equipped motor according to claim 18, wherein the detection stator includes a connector portion extending outwardly form the circumferential wall, and the connector portion includes a terminal electrically connected to the stator coil.

* * * * *